(12) United States Patent
Frisbie et al.

(10) Patent No.: US 9,444,877 B1
(45) Date of Patent: *Sep. 13, 2016

(54) AUTOMATED FILE DELIVERY SYSTEMS AND METHODS

(71) Applicant: West Corporation, Omaha, NE (US)

(72) Inventors: James V. Frisbie, Council Bluffs, IA (US); David W. Archbold, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,597

(22) Filed: Feb. 23, 2016

Related U.S. Application Data

(63) Continuation of application No. 13/846,335, filed on Mar. 18, 2013, now Pat. No. 9,270,737, which is a continuation of application No. 12/754,068, filed on Apr. 5, 2010, now Pat. No. 8,423,992, which is a continuation of application No. 10/186,162, filed on Jun. 27, 2002, now Pat. No. 7,721,280.

(51) Int. Cl.
*G06F 9/445* (2006.01)
*H04L 29/08* (2006.01)
*H04L 12/803* (2013.01)

(52) U.S. Cl.
CPC ............ *H04L 67/06* (2013.01); *H04L 47/125* (2013.01); *H04L 67/10* (2013.01)

(58) Field of Classification Search
CPC ....................................................... H04L 67/10
See application file for complete search history.

*Primary Examiner* — Philip Wang

(57) ABSTRACT

The invention provides systems and methods for automatically delivering a file from an originating computer system including a processor and memory to a destination computer system including a processor and memory. The method includes creating at least one master file delivery application and at least two file delivery agents running on the at least one originating computer system. A first file delivery agent of the at least two file delivery agents is controlled by a first master file delivery application of the at least one master file delivery application. A second file delivery agent of the at least two file delivery agents is run either by a second master file application. The method also includes dynamically balancing loads by the one master file delivery application, between the first file delivery agent controlled by the first master file delivery application and the second file delivery agent. The balancing is based on a number of files retrieved by the first file delivery agent and a number of files retrieved by the second file delivery agent; and transmitting at least one file according to at least one destination parameter associated with the at least one file.

20 Claims, 6 Drawing Sheets

AUTOMATED FILE DELIVERY SYSTEMS AND METHODS

CROSS-REFERENCE TO RELATED APPLICATIONS

This non-provisional application is a continuation of and claims priority from U.S. patent application Ser. No. 13/846,335, filed Mar. 18, 2013, entitled AUTOMATED FILED DELIVERY SYSTEMS AND METHODS, which is a continuation from U.S. patent application Ser. No. 12/754,068, filed 4 May 2010, entitled AUTOMATED FILED DELIVERY SYSTEM AND METHOD, now issued U.S. Pat. No. 8,423,992, which is a continuation of and claims priority from U.S. patent application Ser. No. 10/186,162, filed 27 Jun. 2002, now issued U.S. Pat. No. 7,721,280, and U.S. provisional application Ser. No. 60/305,799, filed 16 Jul. 2001, both entitled AUTOMATED FILE DELIVERY SYSTEM AND METHOD, and both incorporated by reference herein in their entirety.

SUMMARY OF THE INVENTION

In one embodiment, the invention provides a computer-based method of automatically delivering at least one file from at least one originating computer system comprising a processor and memory to at least one destination computer system comprising a processor and memory, the method including at least the following: creating at least one master file delivery application and at least two file delivery agents running on the at least one originating computer system, wherein a first file delivery agent of the at least two file delivery agents is controlled by a first master file delivery application of the at least one master file delivery application and wherein a second file delivery agent of the at least two file delivery agents is run either by a second master file application of the at least one master file delivery application or standalone from the at least one master file delivery application, wherein the standalone second file delivery agents is an on-demand, rerun or primary demo file delivery agent, dynamically balancing loads, by the at least one master file delivery application, between the first file delivery agent controlled by the first master file delivery application and the second file delivery agent run either by the second master file application or standalone from the at least one master file delivery application, wherein the balancing is based on a number of files retrieved by the first file delivery agent and a number of files retrieved by the second file delivery agent, and transmitting at least one file according to at least one destination parameter associated with the at least one file.

In other embodiments, the method further includes scanning at least one directory associated with the at least one originating computer system, finding the at least one file in the at least one directory, obtaining at least one destination parameter associated with the at least one file, and transmitting the at least one file; further including creating at least one master file delivery application and at least one file delivery agent running on the at least one originating computer system; or wherein scanning at least one directory, finding the at least one file, obtaining at least one destination parameter, and transmitting the at least one file are performed by at least one file delivery agent; or further including placing at least one file into the at least one directory; or wherein placing at least one file includes placing the at least one file into at least one normally-empty directory; or further including creating at least one master file delivery application and a plurality of file delivery agents, at least one of the plurality of file delivery agents being associated with a respective master file delivery application; or wherein creating the at least one file delivery agent includes creating at least one file delivery agent that is not controlled by a master file delivery application; or further including creating a plurality of master file delivery applications and a plurality of file delivery agents, at least a first one of the file delivery agents being associated with a first one of the master file delivery applications, and at least a second one of the file delivery agents being associated with a second one of the master file delivery applications; or wherein obtaining at least one destination parameter includes accessing at least one data structure residing on the at least one originating computer system; or wherein obtaining at least one destination parameter includes accessing at least one database table residing on the at least one originating computer system; or wherein obtaining at least one destination parameter and transmitting the at least one file are performed entirely on the at least one originating computer system independently of the at least one destination computer system; or wherein transmitting the at least one file includes initiating a transfer of the at least one file entirely on the at least one originating computer system; or wherein scanning at least one directory includes scanning at least one normally-empty directory; or further comprising putting at least one file delivery agent to sleep for a predetermined timeout period after it completes a first scan of the at least one directory, and further comprising awakening the at least one file delivery agent after expiration of the predetermined timeout period to perform at least a second scan of the at least one directory; or further comprising generating a log file containing information related to at least one file transmission; or further including encrypting the at least one file before transmitting the at least one file; or wherein finding at least one file includes finding a plurality of files in the at least one directory.

In another embodiment, the invention provides an apparatus for automatically delivering at least one file from at least one originating computer system to at least one destination computer system, the apparatus including at least the following: at least one processor and memory, a means for creating at least one master file delivery application and at least two file delivery agents running on the at least one originating computer system, wherein a first file delivery agent of the two file delivery agents is controlled by a first master file delivery application of the at least one master file delivery application and wherein a second file delivery agent of the two file delivery agents is run either by a second master file application of the at least one master file delivery application or standalone from the at least one master file delivery application, a means for dynamically balancing loads, by the at least one master file delivery application, between the first file delivery agent controlled by the first master file delivery application and the second file delivery agent run either by the second master file application or standalone from the at least one master file delivery application, wherein the balancing is based on a number of files retrieved by the first file delivery agent controlled by the first master file delivery application and a number of files retrieved by the second file delivery agent run either by the second master file application or standalone from the at least one master file delivery application, wherein the standalone second file delivery agent is an on-demand, rerun or primary demo file delivery agent, and a means for transmitting at least one file according to at least one destination parameter associated with the at least one file.

In yet another embodiment, the invention provides a program storage device readable by a machine comprising at least one processor and memory, tangibly embodying a program of instructions executable by the machine to perform a method of automatically delivering at least one file from at least one originating computer system to at least one destination computer system, the method comprising at least the following: creating at least one master file delivery application and at least two file delivery agents running on the at least one originating computer system, wherein a first file delivery agent of the at least two file delivery agents is controlled by a first master file delivery application of the at least one master file delivery application and wherein a second file delivery agent of the at least two file delivery agents is run either by a second master file application of the at least one master file delivery application or standalone from the at least one master file delivery application, dynamically balancing loads, by the at least one master file delivery application, between the first file delivery agent controlled by the first master file delivery application and the second file delivery agent run by the second master file delivery application, wherein the balancing is based on a number of files retrieved by the first file delivery agent controlled by the first master file delivery application and a number of files retrieved by the second file delivery agent run either by the second master file application or standalone from the at least one master file delivery application, wherein the standalone second file delivery agent is an on-demand, rerun or primary demo file delivery agent, and transmitting at least one file according to at least one destination parameter associated with the at least one file.

BRIEF DESCRIPTIONS OF THE DRAWINGS

DETAILED DESCRIPTION OF THE INVENTION

Overview of the Invention

The invention provides systems and methods of automatically delivering at least one file from at least one originating computer system 14 to at least one destination computer system 16. In illustrative embodiments of the invention as shown in FIGS. 1 and 2, the systems method comprises at least the following.

Figures 1, 2:
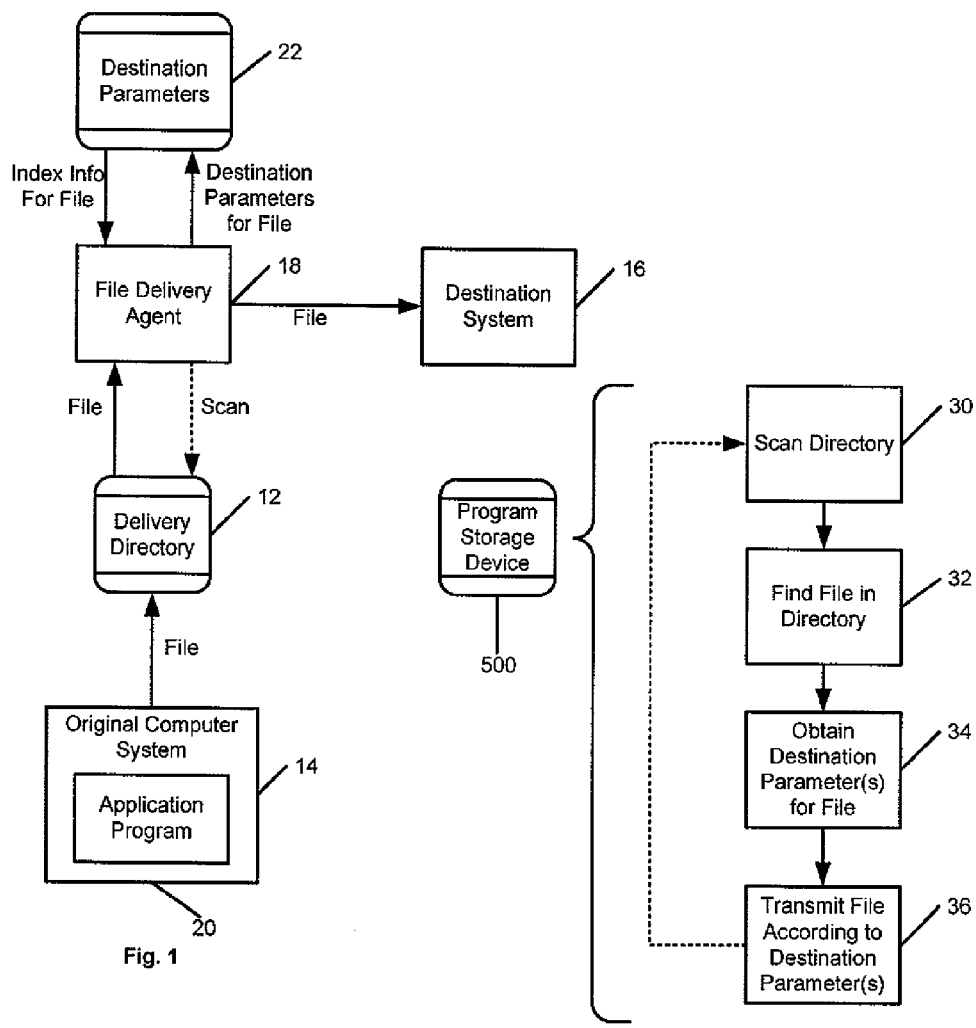
FIG. 1 is a block diagram and data flows associated an illustrative embodiment of the invention.
FIG. 2 is a flow chart of processing performed by an illustrative embodiment of the invention.

At least one delivery directory 12 associated with the originating computer system 14 is reserved or set aside, and is scanned periodically by a file delivery agent 18 constructed in accordance with the invention as described herein (Block 30 in FIG. 2). This delivery directory 12 is adapted to receive at least one file from at least a first application Program 20 running on the originating computer system 14. According to various aspects of the invention, the delivery directory 12 can be configured as a normally-empty directory, in the sense that the delivery directory 12 under normal conditions contains no files. Then, when the application Program 20 places at least one file into the delivery directory 12, that placement serves as a signal to the file delivery agent 18 to initiate the process of delivering that file to the destination computer system 16. When the delivery directory 12 is scanned after placement of the file therein, this scan will locate the file as placed therein (Block 32 in FIG. 2), and the file delivery agent 18 initiates the following processing in response to that locating. Destination parameters 22 associated with the file are obtained (Block 34 in FIG. 2), and the file is transmitted according to the destination parameters (Block 36 in FIG. 2). The processes of scanning, finding, obtaining, and transmitting can be repeated indefinitely to transfer files automatically once they become available, as evidenced by their placement into the delivery directory 12 by the application Program 20.

A data structure or store, such as a table in a database, stores destination parameters 22 associated with the file. These destination parameters 22 might identify the destination computer system 16 for which a given file is intended, the time to transmit the file, and the method to use in transmitting the file, such as for example, Internet e-mail, FTP transfer, transmission via electronic bulletin board, or other electronic transfer methods over a wide area global communications network.

Figure 3:
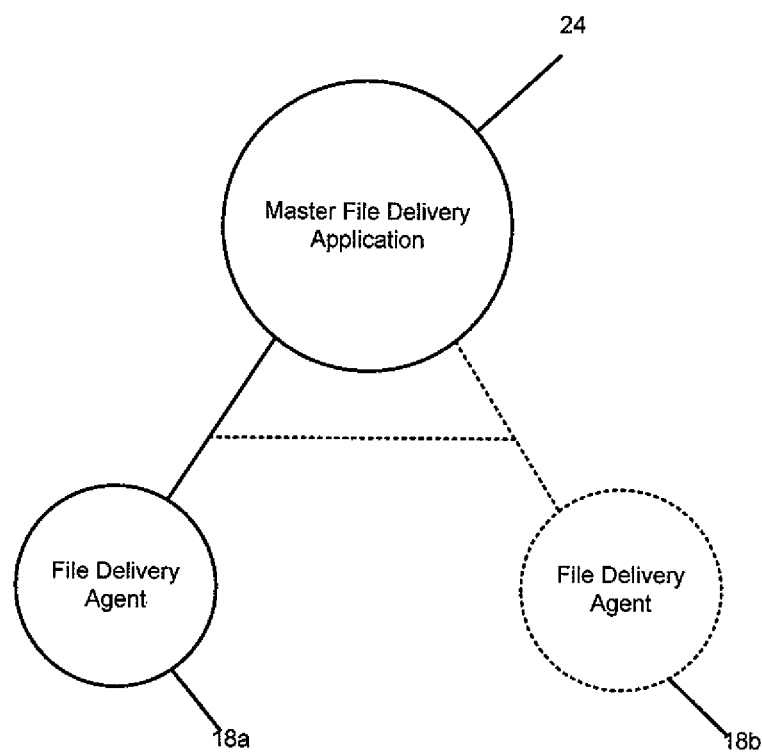
FIG. 3 is a block diagram of a master file delivery application and a file delivery agent.

As shown in FIG. 3, one illustrative implementation of the invention can include creating at least one master file delivery application 24 and at least one file delivery agent 18a or 18b running on the originating computer system 14. The file delivery agent 18a can be, but need not be, associated with and controlled by the at least one respective master file delivery application 24. As discussed in further detail below, certain specialized file delivery agents 18a can be created that are not controlled by a master file delivery application.

Respective ones of the file delivery agents 18a or 18b can be assigned to scan or monitor corresponding ones of the delivery directories 12. The file delivery agent 18a assigned to a given directory 12 scans the given delivery directory, finds the file, obtains destination parameters 22 applicable to the file, and transmits the file as specified by the destination parameters 22. Also, the file delivery agent 18 can be adapted to recognize the placement of the file in the delivery directory 12 as a signal to obtain the destination parameters 22 and transmit the file.

According to various embodiments of the invention, a plurality of master file delivery applications and a plurality of file delivery agents can be created, with at least a first one of the file delivery agents being associated with a first one of the master file delivery applications. Further, at least a second one of the file delivery agents can be associated with a second one of the master file delivery applications.

The process of obtaining destination parameters 22 for a given file can include accessing a data structure, such as a database table, residing on the originating computer system 14, or residing elsewhere but accessible to the originating computer system 14, for example, via local or wide area networks (not shown). The content of suitable database structures is described in more detail below. Given the description herein, the implementation of suitable database structures would be well known to those having ordinary skill in the art.

According to various aspects of the invention, the process of obtaining the destination parameters 22 and transmitting the file can be performed entirely on the originating computer system 14, and can be performed independently of any action taken by the destination computer system 16 or taken by a remote user who may be logged into the destination computer system 16. Further, the process of initiating the transfer can be performed entirely on the originating computer system 14. Accordingly, the remote user receiving the file need not log-in and check the status of the file delivery, or affirmatively request file delivery; instead; once the file is available from the originating computer system 14, it will be delivered in due course by the originating computer system 14 and will be available to the remote user without any action on his/her part. Further, the role of the destination computer system 16 itself becomes passive rather than active; the destination computer system 16 need only react to whatever commands are issued by the originating computer system 14 as the latter initiates and executes the file transfer. Accordingly, the destination computer system 16 need not devote processor cycles to servicing interrupts related to initiating file downloads, or other activities related to initiating file transfers from the originating computer system 14, thereby allowing the destination computer 16 to devote its resources more efficiently towards meeting its local requirements.

As discussed above, the file delivery agent 18 repeatedly scans the delivery directory 12 to search for any new files placed therein. To conserve processor cycles on the originating computer system 14, the file delivery agent 18 may be put to sleep for a predetermined timeout period after it completes a first scan of the directory 12, and be reawakened after the predetermined timeout period to perform another scan of the directory 12. The concepts of putting a process to sleep and reawakening the process are well understood by those skilled in the art. Further, the specific durations of the scan cycles and the sleep cycles can be modified as may be appropriate in given implementations of the invention.

According to various aspects of the invention, the method can include generating a log file containing information related to at least one file transmission. Illustrative contents of this log file are described in further detail below. The log file can be used to check if one or more files were transferred, when they were transferred, and if a retry was attempted after a transfer fail. To promote security, the method can provide the step of encrypting the file before transmitting the file. Finally, the method can be extended readily to process a plurality of files placed into the delivery directory. The plurality of files can be packaged into one package or archive file, and the packaged file can be transmitted to the destination computer system. The method can utilize known software applications to perform this packaging, such as, for a non-limiting example, the well-known WinZip® utility available from WinZip Computing, Inc. (www.winzip.com).

In some applications of the invention, the file delivery agent 18 can be coupled to communicate with the destination computer system 16 over a wide area network (WAN), such as the Internet, World Wide Web, or other global communications network. However, for other applications such as in-house file transfers, the file delivery agent 18 can be coupled to communicate with the destination computer system 16 over a local area network (LAN). If the data structure storing destination parameter 22 and the file delivery agent 18 are hosted in separate processors or servers comprising the originating computer system 14, then they can be coupled to communicate over a local or wide area network linking the respective processors or servers. Otherwise, if the data structure and the file delivery agent 18 are hosted on the same processor or server, then they can communicate via the internal busses of that processor or server, as understood by those skilled in the art.

Figure 4:
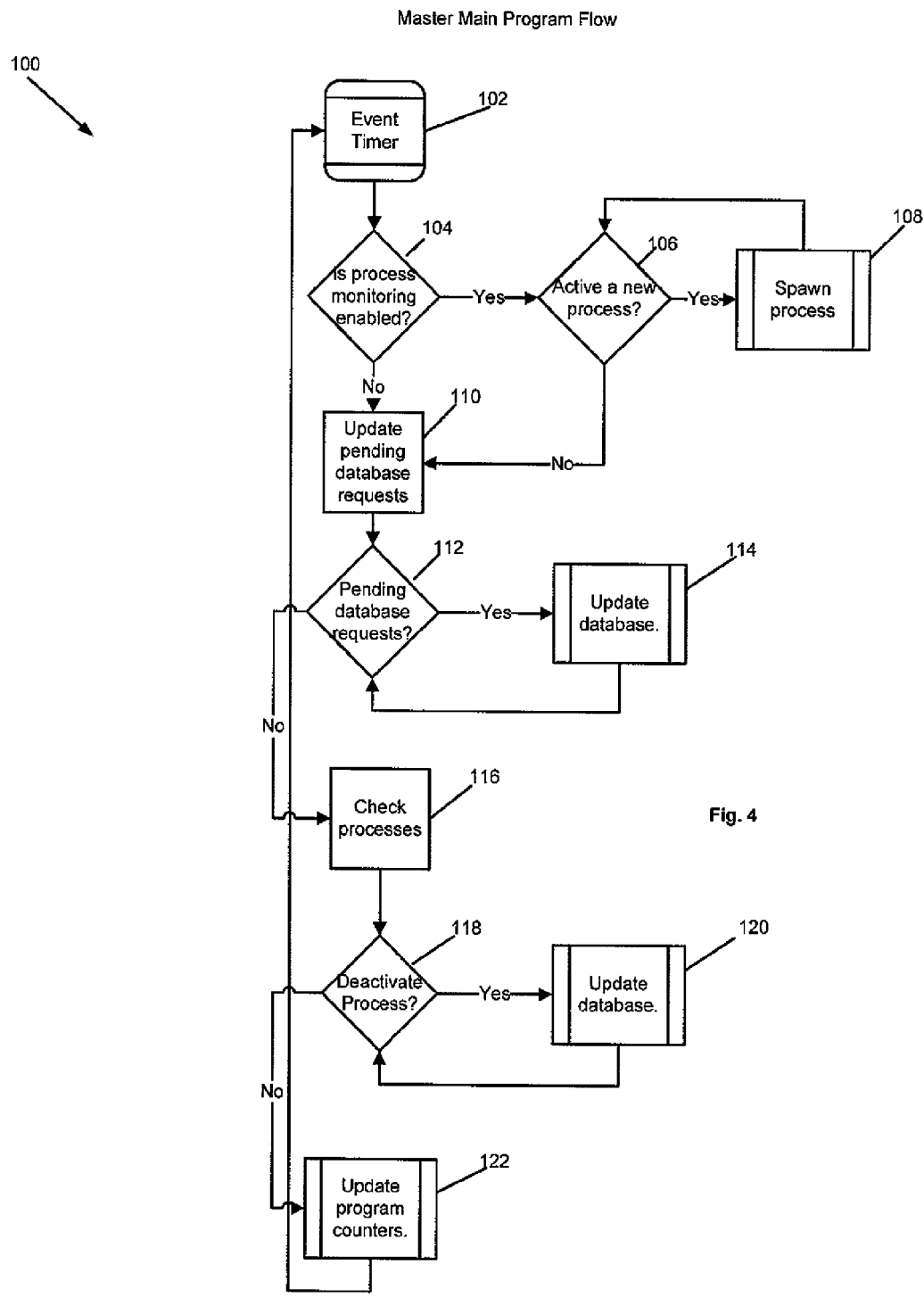
FIG. 4 is a flow chart of processing performed by a master application according to an illustrative embodiment of the invention.

FIG. 4 is a flowchart 100 of processing performed by a master file delivery application 24 provided according to an illustrative method of the invention. At block 102, the master file delivery application 24 initiates an event timer, which controls and synchronizes the processing performed by the rest of the processing blocks in FIG. 4 by controlling when they are initiated. After expiration of the timer, the method proceeds to block 104, where the master file delivery application 24 checks to see whether monitoring of file delivery agents 18 is enabled. If such monitoring is enabled, the method proceeds to block 106, where the master file delivery application 24 evaluates whether to activate a new file delivery agent 18.

If a new file delivery agent 18 is to be activated, the method proceeds to block 108, where the master file delivery application 24 spawns a new file delivery agent 18, and thereafter the method returns to block 106. If a new file delivery agent 18 is not to be activated at this point, the method proceeds to block 110.

Returning to block 104, if monitoring of file delivery agents 18 is not enabled, the method proceeds to block 110, where any pending requests to update configuration databases are processed, resulting in an update to the various databases affected by such requests. The method then proceeds to block 112, where the master file delivery application 24 determines whether any additional database requests are pending. If so, the method proceeds to block 114, where the additional update requests are processed, and returns to block 112 afterwards to repeat the loop for all additional requests.

When all pending database requests are processed, the method proceeds to block 116, where the master file delivery application 24 checks on the status of all active file delivery agents 18, and then proceeds to block 118, where the master file delivery application 24 evaluates whether to deactivate any currently active file delivery agents 18. If so, the method proceeds to block 120, where all configuration databases are updated as necessary to reflect any deactivated file delivery agents 18, and the method returns to block 118 to repeat the loop for each file delivery agent 18 to be deactivated. When all file delivery agents 18 slated for deactivation have been processed, the method proceeds to block 122, where the master file delivery application 24 updates all relevant program counters as necessitated by the foregoing processing, and the method then returns to block 102 in preparation for another iteration through the loop shown in FIG. 4.

Figure 5:
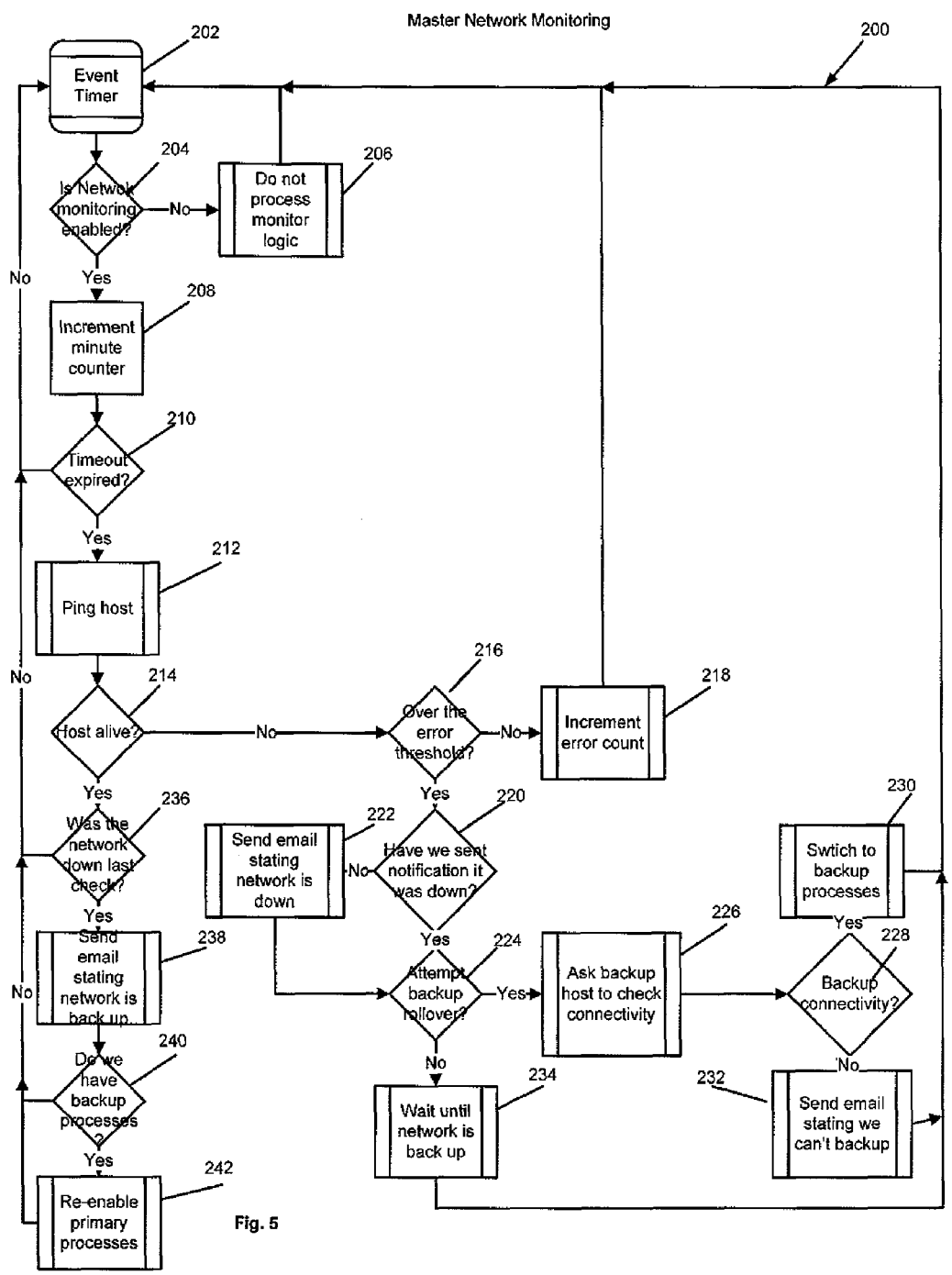
FIG. 5 is a flow chart of network monitoring performed by an illustrative embodiment of the invention.

FIG. 5 is a flowchart 200 of network monitoring performed by an illustrative embodiment of the master file delivery application 24 to ensure network connectivity. An event timer 202 controls the initiation of all processing shown in FIG. 5, similar to event timer 102 in FIG. 4. After the expiration of event timer 202, the method proceeds to block 204 to evaluate whether network monitoring is enabled. If not, processing proceeds to block 206, which is essentially a wait state that ultimately returns program flow to the event timer 202 to await the next iteration through the loop. If the output of the block 204 is yes, processing proceeds to block 208, where the minute counter is incremented.

Processing then proceeds to block 210, which evaluates whether the timeout has expired yet. If not, processing returns to event timer 202. If yes, processing proceeds to block 212, which pings the network host being monitored. The term "ping" is well known in the art as a process by which a monitoring agent sends a signal over a network to a monitored network entity, and awaits a response from the monitored network entity to confirm that the monitored network entity is active or "alive".

The method then proceeds to block 214, which evaluates whether the network host is alive based on its response to the ping sent in block 212. If the output of block 214 is no, processing proceeds to block 216, which evaluates whether the method is currently over a predefined, allowed error threshold. If the output of block 216 is no, processing proceeds to block 218, where the error count is incremented, and then returns to event timer 202 to await the next iteration through the loop. If the output of block 216 is yes, processing proceeds to block 220, which evaluates whether the method has sent a notification at the monitored network host is down. If yes, processing proceeds to block 224. If no, processing proceeds to block 222, where an email or other notification is sent stating that the network host is down, and processing proceeds to block 224.

At block 224, the method evaluates whether to attempt a rollover to a backup network host, to redirect processing assigned with the down network host to the backup network host. If the output of block 224 is yes, processing proceeds to blocks 226 and 228, which check connectivity to the backup network host. If the output of block 228 is yes, the method proceeds to block 230 to switch all active file delivery agents 18 to the backup network host. Otherwise, if the output of block 228 is no, the method proceeds to block 232 to send an email or other communication stating that the method cannot switch to the backup network host. After completing either block 230 or block 232, the method returns to the event timer 202 to await the next iteration of the loop.

Returning to block 224, if the output of this block is no, the method proceeds to block 234, which is essentially a wait state, wherein the method awaits the network host coming back on-line. Once the network host is back up, processing proceeds to the event timer 202.

Returning to block 214, if the monitored network host is on-line, as evidenced by its response to the ping sent in block 212, processing proceeds to block 236, which evaluates whether the network host was down at the last pass through the loop shown in FIG. 5. If the output of block 236 is no, processing returns event timer 202. If the output of block 236 is yes, processing proceeds to block 238, wherein the methods sends an email or other communications stating that the network host is now back up. After executing block 238, the method proceeds to block 240, which evaluates whether the method has backup file delivery agents 18 active. If the output of block 240 is yes, the method proceeds to block 242, which deactivates all active backup file delivery agents 18 and re-enables the primary file delivery agents 18. Afterwards, the method returns to event timer 202 to await the next iteration through the loop.

Figure 6:
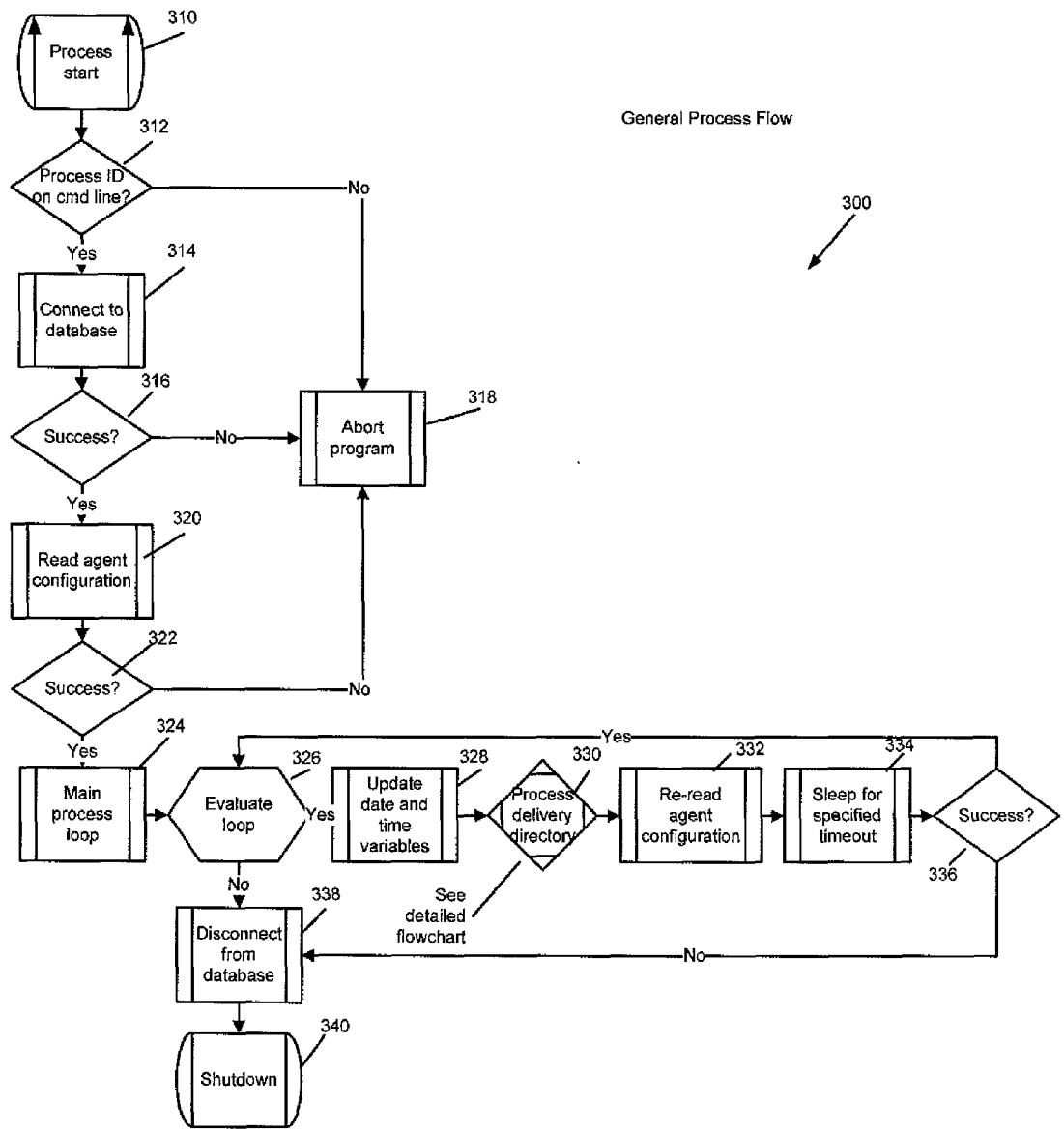
FIG. 6 is a flow chart of processing performed by a file delivery agent according to an illustrative embodiment of the invention.

FIG. 6 is a flowchart 300 of illustrative, but not limiting, processing performed by a file delivery agent 18 according to an illustrative embodiment of the invention. The process begins at block 310 and proceeds to block 312, where it determines if there is an identifier for a file delivery agent being passed to it via a command line. If no, the method proceeds to block 318, wherein the method essentially terminates and returns to the calling routine. If yes, the process proceeds to block 314, where the process connects to a database to retrieve information or parameters associated with the file delivery agent 18 whose identifier was received in block 312. After attempting to connect to the database in block 314, the process proceeds to block 316, which evaluates the success of the database connection. If the output of block 316 is no, the method proceeds to termination block 318. If the output of block 316 is yes, the process proceeds to block 320, wherein the method reads configuration data for the given file delivery agent 18. The method then proceeds to block 322, which evaluates the success of block 320. If the output of block 322 is no, the method proceeds to termination block 318.

If the output of block 322 is yes, the method proceeds to block 324, which begins the main loop comprising blocks 326, 328, 330, 332, 334, and 336. Proceeding to block 326, the method evaluates the loop boundary variable, and determines whether to execute another iteration of the main loop. Those skilled in the art will understand at any number of programming constructs can be used to implement the of loop iteration and boundary testing as discussed herein. If the output of block 326 is yes, the method proceeds to block 328, which updates any time and date variables that are relevant to the process flow. The method then proceeds to block 330 to process the delivery directory 12 assigned to the given file delivery agent 18. Block 330 is described and illustrated in more detail in FIG. 7 below. The method then proceeds to block 332 to reread any configuration data for the file delivery agent 18 that may have changed since the last iteration through the loop. The method then proceeds to block 334 to enable the file delivery agent 18 to sleep for a specified timeout period before resuming another iteration through the loop. The file delivery agent 18 may be configured not to sleep at all by setting the timeout period to null or zero. The method ends the loop by proceeding to block 336 to determine whether the previous pass through the loop was a success. If yes, the method returns to block 326 to evaluate whether to make another pass through the loop. If no, the method proceeds to block 338.

Returning briefly to block 326, if the output of this block is no, thereby indicating that the main loop has been exhausted, the method proceeds to block 338, at which point the file delivery agent 18 is disconnected from all databases to which it was connected previously. The method then terminates by proceeding to block 320, which is a shutdown step understood by those skilled in the art.

Figure 7:
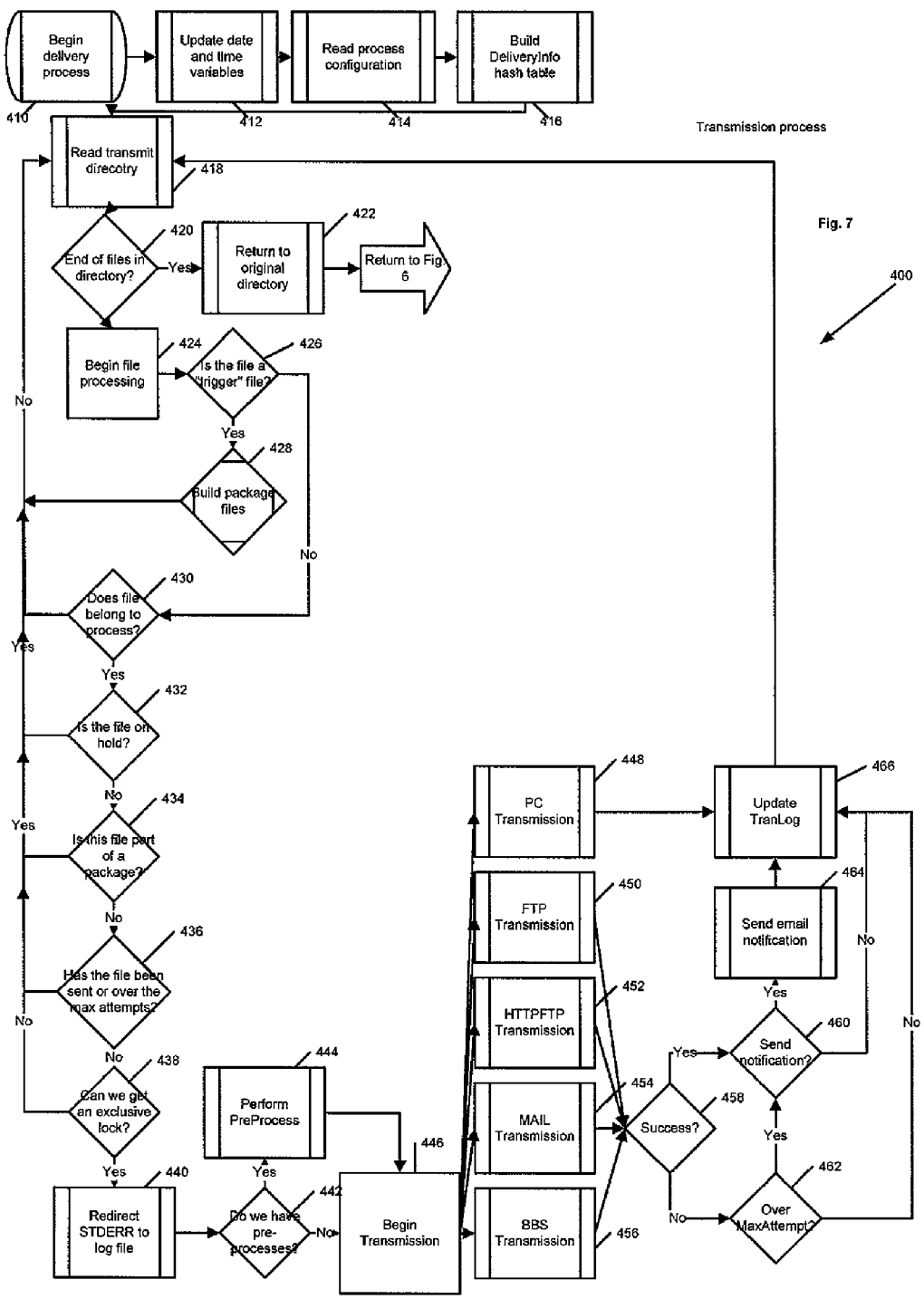
FIG. 7 is a flow chart of a file transmission process performed by a file delivery agent.

FIG. 7 is a flowchart 330 of an illustrative, but not limiting file transmission process performed by a file delivery agent 18. The transmission process illustrated in FIG. 7 begins at block 410, and proceeds to block 412 to update any relevant time and/or date variables. The process then proceeds to block 414 to read any configuration data specific to the given file delivery agent 18, and proceeds to block 416 to build the DeliveryInfo parameter file or table, such as destination parameters 22. The process then proceeds to block 418 to read the delivery directory 12, and then to block 420, where the method evaluates whether the file delivery agent 18 has reached the bend of the delivery directory 12. If yes, then at block 422, the file delivery agent 18 returns to the original directory, and ultimately returns to the main routine loop as illustrated in FIG. 6. If the output of block 420 block is no, then more files remain to be processed in the delivery directory 12, and the method proceeds to block 424 to read these files.

At block 426, the method determines whether a file in the delivery directory 12 is a "trigger" file, which is described in further detail herein. If yes, the method proceeds to block 428 to build all package files associated with the trigger file located in block 426. Afterwards, the method returns to block 418 to continue to monitor the delivery directory 12.

Returning to block 426, if the output of this block is no, the method proceeds to block 430, which determines whether or not the located file belongs to the given file delivery agent 18. If yes, the method proceeds to block 432. if no, the method returns to block 418 to continue to monitor the delivery directory 12.

At block 432, the method determines whether the file located in the delivery directory 12 is on "hold" (not to be delivered) for any reason. If the file is on hold, the method returns to block 418, if not, the method proceeds to block 434, where the method determines whether or not the located file is part of a package pointed to by a trigger file, as referred to above in connection with block 426. If not, the method proceeds to block 436. Otherwise, if the file is part of a package, the method returns to block 418.

At block 436, the method determines whether the file has already been sent, or whether previous unsuccessful attempts to deliver the file have exceeded a threshold for unsuccessful or failed attempts. If yes, the method returns to block 418. If not, the method proceeds to block 438, where the method determines whether the file delivery agent 18 can acquire an exclusive lock on the given file located in the delivery directory 12. If not, the method returns to block 418. If yes, the method proceeds to block 440. As understood by those in the computer software arts, specifically the operating systems and database administration arts, the owner of the exclusive lock on a resource has exclusive access to the locked resource to the exclusion of all other entities that may seek access to that resource.

At block 440, the method can redirect the Standard Error Data Flow (STDERR) to a log file, thereby directing all standard error messages to be captured in a log file for future reference. At block 442, the method determines whether preprocessing is indicated for the given file located in the delivery directory 12. If not, the method proceeds directly to block 446 to begin transmitting the file. If yes, the method proceeds to block 444 to perform all indicated preprocessing on the file before delivery, and then proceeds to block 446 to begin transmission of the located file.

Blocks 448, 450, 452, 454, and 456 represent a variety of different transmission methods available according to various aspects of the invention. Block 448 represents a PC transmission, block 450 represents an FTP transmission, block 452 represents an HTTP FTP transmission, block 454 represents a mail transmission, and finally block 456 represents a BBS transmission. If a PC transmission via block 448 is chosen, the method proceeds directly to block 466 to update the transmission log after transmission of the file has either completed or failed. After processing the other four blocks 450, 452, 454, and 456, the method proceeds to block 458 to determine whether the transmission was successful. If yes, the method proceeds to block 460 to determine whether to send a notification of the transmission status. If no, the method proceeds to block 462 to determine if a number of transmission failures associated with the current file exceeds a permissible threshold. If no, the method proceeds to block 466 to update the transmission log. If yes, the method proceeds to block 460 to determine whether to send a notification of the transmission status. If yes, the method proceeds to block 464 to send an email or other notification regarding the transmission status of the given file, and then proceeds to block 466 to update the transmission log. If the output of block 460 is no, the method proceeds directly to block 466. After completing the processing depicted in block 466, the method returns to block 418 to make the next pass through the delivery directory 12.

Detailed Description of Illustrative Embodiments of the Invention

The invention provides a system and method that automates the delivery of files. The system can include: a Master file delivery Application 24 (hereafter "Master Application"), at least one file delivery agent 18 (hereafter "delivery agents") (or system process), an SQL server hosting a data store such as an SQL table or database storing destination parameters 22, and a web interface.

The Master Application 24 can be implemented as a Win32-based application that monitors and controls most of the individual delivery agents 18, with the exceptions noted below. The Master Application 24 ensures that if a delivery agent 18 terminates unexpectedly or if connection to the SQL table is lost, that the proper support staff are notified. It also can clean up inactive delivery agents 18 and provide a process management console to enable users to create and configure new delivery agents 18.

According to various aspects of the invention, it is possible to run multiple Master Applications 24 in a single environment. Each Master Application 24 has an assigned "MasterID" and only controls those delivery agents 18 assigned to that "MasterID". Each Master Application 24 can have its own "Primary" delivery agent 18, i.e., that delivery agent 18 to which file transmissions are assigned by default.

The delivery agents 18 are responsible for doing most of the functions related to file transfers. These delivery agents 18 are assigned at least one respective delivery directory 12 to monitor, and each delivery agent 18 continually monitors its delivery directory 12, looking for new files to deliver. After a pass through the directory 12 is complete, the delivery agent 18 can be configured to go to sleep for its specified timeout period, after which it awakes and re-scans the directory 12. When a new file is found, the file is compared to the destination parameters 22 stored in the data store, such as the Delivery Info SQL table described below. If the file is found in that table, if it belongs to the delivery agent 18, and if the file hasn't already been sent, the delivery agent 18 will try to send the file using the delivery-specific information found in the DeliveryInfo table.

In an illustrative embodiment, wherein each delivery agent 18 is single-threaded (i.e., it can only do one thing at a time), the invention can include creating any number of multiple delivery agents such as delivery agents 18*a* and 18*b*, each with their own tasks and workload. The invention can also include allowing the Master Application 24 to dynamically balance loads between delivery agents 18*a* and 18*b*.

As noted above, all delivery agents 18 may not fall under the control of the Master Application 12. These "free" delivery agents 18 can be Rerun or Onetime delivery processes as described below, they might be monitored by a different Master Application 24, or they may be running standalone without supervision from any Master Application 24.

All of the configuration, delivery data, transmission logs, and notification lists can be stored in suitable data stores that can be hosted by the SQL server. A suitable SQL server is MySQL™ 3.23 server for the Windows NT™ operating system although it should be understood that other commercially available server or database packages may be used depending on the circumstances of a given application.

A collection of web-based PHP scripts and HTML pages provide the main interface, in web form, to the system. This web interface allows users and administrators, for example, to update the DeliveryInfo table, monitor processes, configure and create new processes or delivery agents, view log files, view transmission histories, resend files using the ONETIME delivery process, and administer registered users.

Current Delivery Agents

Table 1 below contains an illustrative list of delivery agents 18 that could be included in a Production environment, including delivery agents 18 not controlled by a Master Application 24, along with a description of the duties assigned to each delivery agent 18. Those skilled in the art will realize that the names below are for ease of reference only, and are not intended to limit the invention. Various numbers and types of delivery agents can be provided according to different illustrative embodiments of the invention.

TABLE 1

| Agent name | Description |
| --- | --- |
| PRIMARY | This is the main delivery agent for delivering files can run under the Master Application MAST01. |
| PGPPROC | This agent is designed to handle PGP encryption and delivery can run under the Master Application MAST01. |
| PACKAGE | This agent is designed to handle package creations and deliveries can run under the Master Application MAST01. |
| STAFF_PRIMARY | Primary process running on a backup LAN, such as one associated with system support staff can run under the Master Application STAFF01. |
| PRIMARY_BAK | Backup agent for the PRIMARY process on the production side can run under the Master Application STAFF01. |
| PGPPROC_BAK | Backup agent for the PGPPROC process on the production side can run under the Master Application STAFF01. |
| PACKAGE_BAK | Backup agent for the PACKAGE process on the production side can run under the Master Application STAFF01. |
| ONETIME | This agent allows data center operators to send files in on-demand can run dynamically. |
| RERUN | Similar to the ONETIME process, except this process is designed to resend cycle created files can run dynamically. |
| DEMOPROC | Primary Demo delivery agent. |

SQL Table Structure

Overall SQL Table Structure

A system constructed according to the invention can include several data structures or stores, such as SQL tables, that are the core of the architecture. Brief descriptions of each table are provided here, with more detailed descriptions to follow below.

The DeliveryInfo table contains all information relating to the delivery of a file along with the MailInfo, Ftpinfo, HTTPFTPInfo, PCInfo and BBSInfo tables, which contain the actual delivery information specific to each type of transfer. The CCInfo table specifies information relating to transmitting courtesy copies (if any) to a chosen recipient when a file is transmitted. The PackageInfo table is also associated with these tables and provides information on packaging requirements.

The Translog and TransLogArchive tables store all the results from transmission attempts. The RerunLog table stores onetime delivery attempts and resends of cycle created files.

The TriggerLog table retains information about which Package trigger files were tagged. The ProcConfig table contains configuration information for each of the delivery agent 18 while the ProcStatus table contains information about the status and state of each delivery agent 18.

The UsersAccess table contains the names of the users permitted to use the system and what their access permissions are.

The PurgeList table contains a list of file names that are to have their associated transmissions deleted at a specified date. This is used to help keep the system from maintaining definitions that will no longer create file transmissions.

And finally, the NetmonTable provides a list of network hosts that the Master Applications 24 can use to determine if they have connectivity to the outside world.

DeliveryInfo Table

The DeliveryInfo table contains the information needed to send a file to a client destination computer system 16.

Table 2 is an illustrative layout of the DeliveryInfo table:

TABLE 2

| Field name | Data type | Description |
| --- | --- | --- |
| LANFileName | Text | Primary key. Contains the variable name of the file in the TRANSMIT or "delivery" directory 12. |
| DestFileName | Text | Variable destination file name. |
| TFileName | Text | Name of associated transmission file name. |
| PreProcess | Text | PreProcess (ZIP/PGP/etc) indicator. |
| PreProcessPasswd | Text | Optional password or key used in the pre-process. |
| TransMethod | Text | Method of transmission. |
| MiddayFlag | Char | A Y,N indicator for a Midday pull transmission. |
| CreateInterval | Text | Creation interval (DAILY/WEEKLY/etc). |
| OnholdFlag | Char | On-hold indicator. Files on hold will not be sent. |
| RealtimeFlag | Char | This Y,N flag indicates whether the file should be sent as its timestamp changes. |
| MaxSendAttempts | Integer | Maximum number of times to retry a transmission if the transmission initially fails. |
| LastModify | TimeStamp | Last date/time a record was modified. |
| TypeFlag | Text | How the file was created. PDL or SOURCE. |
| NotifyAddrList | Text | Email notification list for file delivery/failure. |
| ProcessID | Text | Name of the delivery agent 18 responsible for sending this file. |
| Comments | Text | Free-format text field for comments |

CCInfo Table

The CCInfo table contains the information required to send out a copy of a transmission file to internal recipients; i.e. after a file has been delivered, the delivery agents will look up the T file in this table to determine if and who should receive a copy of the file via e-mail.

Table 3 is a layout of the CCInfo table:

TABLE 3

| Field name | Data type | Description |
| --- | --- | --- |
| TFileName | Text | Primary Key. T file name corresponding to the TfileName field in the DeliveryInfo table. |
| AddressList | Text | A list of recipients to receive the copy of the file. |
| LastModify | Timestamp | Date and time a record was last modified. |

PackageInfo Table

The PackageInfo table contains information related to the triggering and creating of package files, which are archives containing multiple files.

Table 4 is a layout of the PackageInfo table:

TABLE 4

| Field name | Data type | Description |
| --- | --- | --- |
| PackageFileName | Text | Primary key. Contains the variable name of the package file to create in the TRANSMIT directory 12. |
| TriggerFileName | Text | Contains the variable name of the file in the TRANSMIT directory that "triggers" the creation of the package. |
| Method | Text | Determines which packaging method to use, for example, the WinZip ® utility. |
| MethodPasswd | Text | Determines the password or key used to encrypt the package. |
| LastModify | Timestamp | Date and time a record was last modified. |

MailInfo Table

The MailInfo table contains information on how to send an e-mail transmission.

Table 5 is a layout of the MailInfo table:

TABLE 5

| Field name | Data type | Description |
| --- | --- | --- |
| LANFileName | Text | Primary key. Contains the variable name of the file in the TRANSMIT directory 12. |
| AddressTo | Text | Email addresses (may be delimited by ';' or other suitable character) to which the email is sent. |
| AddressFrom | Text | Email addresses (may be delimited by ';' or other suitable character) inserted in the "FROM" field. Generally automail@domain.tld. |
| Subject | Text | Subject line of the e-mail. Variables can be in the subject line. |
| Body | Text | Message body of the e-mail. Variable can be in the message. |
| TransFlag | Text | Any additional flags/options/switches for a transmission. |
| LastModify | TimeStamp | Last date/time a record was modified. |

FtpInfo Table

The FtpInfo table contains information on how to send an FTP transmission.

Table 6 is a layout of the FtpInfo table:

TABLE 6

| Field name | Data type | Description |
| --- | --- | --- |
| LANFileName | Text | Primary key. Contains the variable name of the file in theTRANSMIT directory 12. |
| Host | Text | Host name or IP address of FTP server to which to connect. |
| UserName | Text | User name or ID used to log into the FTP server. |
| Password | Text | Password to use along with the UserName when logging into the FTP server. |
| Directory | Text | Destination directory in which to place the file being transmitted. Can be left blank or NULL for users root directory. |

TABLE 6-continued

| Field name | Data type | Description |
| --- | --- | --- |
| TransFlag | Text | Any additional flags/options/switches for a transmission. |
| LastModify | TimeStamp | Last date/time a record was modified. |

HttpFtpInfo Table

The HttpFtpInfo table contains information on how to send an HTTPFTP transmission.

Table 7 is a layout of the HttpFtpInfo table:

TABLE 7

| Field name | Data type | Description |
| --- | --- | --- |
| LANFileName | Text | Primary key. Contains the variable name of the file in the TRANSMIT directory 12. |
| Directory | Text | Destination directory in which to place the file being transmitted. Can be left blank or NULL for users root directory. |
| TransFlag | Text | Any additional flags/options/switches for a transmission. |
| LastModify | TimeStamp | Last date/time a record was modified. |

PCInfo Table

The PCInfo table contains information on how to send a PCtransmission.

Table 8 is a layout of the PCInfo table:

TABLE 8

| Field name | Data type | Description |
| --- | --- | --- |
| LANFileName | Text | Primary key. Contains the variable name of the file in the TRANSMIT directory 12. |
| Directory | Text | Directory to copy the destination file to. Can be left empty to use the current working transmit directory. |
| TransFlag | Text | Any additional flags/options/switches for a transmission. |
| LastModify | TimeStamp | Last date/time a record was modified. |

BBSInfo Table

The BBSInfo table contains information on how to send a BBS transmission.

Table 9 is a layout of the BBSInfo table:

TABLE 9

| Field name | Data type | Description |
| --- | --- | --- |
| LANFileName | Text | Primary key. Contains the variable name of the file in the TRANSMIT directory 12. |
| Directory | Text | Directory to place the file being transmitted. Assumes T:\TBBSOUT root directory. |
| TransFlag | Text | Any additional flags/options/switches for a transmission. |
| LastModify | TimeStamp | Last date/time a record was modified. |

TransLog Table

The TransLog table can store results from the system's attempts to send a file. The table can be keyed off the expanded LANFileName, i.e., the actual name of the file in the TRANSMIT directory 12. It can also contain a link back to the DeliveryInfo table by way of the LANFileName field. The table can be structured in this manner to allow for multiple days worth of logging to be stored together. The contents of the Translog can be used to generate the various transmission status and summary reports.

Table 10 is a layout of the TransLog table:

TABLE 10

| Field name | Data type | Description |
|---|---|---|
| ExpandedLANFile | Text | Expanded (non-variable) name of file that was sent. First part of composite key. |
| LANFileName | Text | Variable name of file in the TRANSMIT directory. Used as a key to the DeliveryInfo table. |
| ExpandedDestFile | Text | Name of destination file name on the client's end (non-variable). |
| SentFlag | Char | A Y,N flag indicating whether the file transfer was a success. |
| PCTransFlag | Char | PC Transmission flag. See Notes for PC transmissions. |
| NumAttempts | Integer | Number of attempts so far to send the file. |
| Time | Time | Time of the transmission. |
| Date | Date | Date the transmission was sent in YYYY-MM-DD format. |
| StatusMesg | Text | Miscellaneous status message populated by the delivery agent 18 or other processes. |
| OSFileStamp | Text | OS specific date and time of file creation or last modification. Second part of composite key. |

TransLogArchive Table

The TransLogArchive table can contain information on all file deliveries done through the system. The primary difference between the TransLog and the TransLogArchive tables is that the Archive table does not store foreign key mappings back to the delivery information tables. Therefore, changes and deletions to the rest of the database do not effect the Archive table and makes the Archive table a true reflection of "what is delivered".

Table 11 is a layout of the TransLogArchive table:

TABLE 11

| Field name | Data type | Description |
|---|---|---|
| ExpandedLANFile | Text | Expanded (non-variable) name of file that was sent. First part of composite key. |
| ExpandedDestFile | Text | Name of destination file name on the client's end (non-variable). |
| SentFlag | Char | A Y,N flag indicating whether the file transfer was a success. |
| PCTransFlag | Char | PC Transmission flag. See Notes for PC transmissions. |
| Time | Time | Time of the transmission. |
| Date | Date | Date the transmission was sent in YYYY-MM-DD format. |
| StatusMesg | Text | Miscellaneous status message populated by the delivery agent 18 or other processes. |

RerunLog Table

The RerunLog table is similar to the TransLog but differs on how the records are entered. Unlike the TransLog, the RerunLog is designed to accommodate multiple "sends" of a file assuming that the files are sent on different times. This enables tracking of each time a file is resent, unlike the TransLog which only allows recording the last time the file was sent (for a given day).

Table 12 is a layout of the RerunLog table:

TABLE 12

| Field name | Data type | Description |
|---|---|---|
| TimeStamp | timestamp | Time stamp of the rerun. This serves as the first part of the composite key for this table. |

TABLE 12-continued

| Field name | Data type | Description |
|---|---|---|
| Time | time | Time the rerun was performed in HH:MM:SS format. |
| Date | date | Date the rerun was performed in YYYY-MM-DD format. |
| LANFileName | Text | Variable name of file in the TRANSMIT directory 12. Used as a key to the DeliveryInfo table. |
| ExpandedLANFile | Text | Expanded (non-variable) name of file that was sent. Second part of the composite key. |
| ExpandedDestFile | Text | Name of destination file name on the client's end (non-variable). |
| SentFlag | Char | A Y,N flag indicating whether the file transfer was a success. |
| PCTransFlag | Char | PC Transmission flag. See Notes for PC transmissions. |
| StatusMesg | Text | Misc status message populated by delivery agent 18 or other processes. |

TriggerLog Table

The TriggerLog table is used to record the presence of package "trigger" files. When a specific trigger is found, the delivery agents mark off when they processed the packages associated with that trigger.

Table 13 is a layout of the TriggerLog table:

TABLE 13

| Field name | Data type | Description |
|---|---|---|
| ExpandedTriggerFile | Text | Expanded (non-variable) name of the trigger file. Composite key field 1. |
| TriggerFileName | Text | Variable name of trigger file in the TRANSMIT directory 12. Can be used as a foreign key to the PackageInfo table. |
| OSFileStamp | Text | OS specific date and time of file creation or last modification. Second part of composite key. |
| ProcessID | Text | Name of the delivery agent 12 that logged this entry. Composite key field 3. |
| Time | Time | Time this record was logged. |
| Date | Date | Date when this record was logged. |
| StatusMesg | Text | Any additional status messages for this log entry. |

ProcConfigTable Table

The ProcConfigTable defines the properties and configuration of each registered delivery agent 18. The Master Application process can use this table to determine the configuration setup for the delivery agents 18 under its control.

Table 14 is a layout of the ProcConfigTable table:

TABLE 14

| Field name | Data type | Description |
|---|---|---|
| ProcessID | Text | Process (or agent) identifier (primary key) corresponding to given delivery agent(s) 18. |
| MasterID | Text | Used to determine which master process 24 is in charge of a given delivery agent 18. |
| PrimaryFlag | Char | A Y,N flag field used by the master process(es) 24 to determine if a particular delivery agent 18 should be the "main" one. |
| Active | Char | Y,N flag that indicates whether the given delivery agent 18 is active or not. |

TABLE 14-continued

| Field name | Data type | Description |
| --- | --- | --- |
| Timeout | Integer | Number of seconds that the delivery agent 18 should "sleep" between checks of delivery directory 12. |
| TransmitDir | Text | Delivery directory 12 to monitored by given delivery agent 18, typically local to machine on which delivery agent 18 is running. |
| LogDir | Text | Log directory to store process and debug log files. This can contain variable file characters. |
| PreProcess | Char | Y,N flag that indicates whether the delivery agent 18 will perform PreProcesses or not. |
| PathToZip | Text | Local path to the PKZIp program. Need not include actual pkzip.exe program file name. |
| PathToPGP | Text | Local path to the PGP program. Need not include actual pgp program file name. |
| NotifyAddrList | Text | A list of address to notify in the event of process errors. |
| LastModify | Timestamp | Last date/time a record was modified. |

ProcStatus Table

The ProcStatus table contains information about the state and status of the delivery agents 12. "Heartbeat" indicators, as well as last file processed, are recorded here.

Table 15 is a layout of the ProcStatus table:

TABLE 15

| Field name | Data type | Description |
| --- | --- | --- |
| ProcessID | Text | Process (or agent) identifier (primary key) corresponding to delivery agent(s) 18. |
| HeartBeat | Timestamp | Timestamp field recording the last time the delivery agent 18 "checked in". |
| LastLANFile | Text | Records the last LANFileName record that was processed. |
| StatusMesg | Text | Free format text field that contains the status of the delivery agent 18. |

UsersAccess Table

This table contains all the users and their access permissions in the system.

Table 16 is a layout of the ProcConfigTable table:

TABLE 16

| Field name | Data type | Description |
| --- | --- | --- |
| UserName | Text | User name used to authenticate to operating system, such as Windows NT™ (primary key) |
| UserDesc | Text | Free-format description of the user (generally their first and last name) |
| QueryDeliveryInfo | Char | Y,N flag that indicates whether the user can query the DeliveryInfo table. |
| ModDeliveryInfo | Char | Y,N flag that indicates whether the user can update/delete records in the DeliveryInfo table. |
| ModSpecialDelivery | Char | Y,N flag that indicates whether the user has access to alter the "special" fields in the DeliveryInfo table. |
| EnablePGP | Char | Y,N flag that indicates whether the user is able to setup a new PGP-encrypted file. |
| EnableOnetime | Char | Y,N flag that indicates whether the user can use the Onetime delivery process to send files. |
| ModNotifyList | Char | Y,N flag that indicates whether the user can modify the Email Notification Lists. |

TABLE 16-continued

| Field name | Data type | Description |
| --- | --- | --- |
| ViewLogFiles | Char | Y,N flag that indicates whether the user can view debug log files generated by the invention. |
| ViewTransLog | Char | Y,N flag that indicates whether the user can view the TransLog AND RerunLog tables. |
| EnableRerun | Char | Y,N flag that indicates whether the user can use the Rerun delivery process to resend cycle files. |
| ModTransLog | Char | Y,N flag that indicates whether the user can modify entries in the TransLog (like add comments, etc). |
| ModRerunLog | Char | Y,N flag that indicates whether the user can modify entries in the RerunLog (like comments, etc). |
| DelTransLog | Char | Y,N flag that indicates whether the user can remove TransLog entries. |
| DelRerunLog | Char | Y,N flag that indicates whether the user can remove RerunLog entries. |
| ModProcConfig | Char | Y,N flag that indicates whether the user has access to query and update the ProcConfigTable. |
| ModAccess | Char | Y,N flag that indicates whether the user has access to query and update the UsersAccess table. |
| LastModify | Timestamp | Date and time stamp when a record was last updated. |

NetmonTable

The NetmonTable can be used by the Master Applications 24. This table provides the Master Applications 24 with a list of hosts to query when they are attempting to determine if they have Internet connectivity. Only hosts marked as "Active" will be queried. When a host responds to a Master Application's request, the Master Application 24 will mark the date and time the host responded. This way, a separate script can be generated to determine which hosts are no longer available.

Table 17 is a layout of the NetmonTable:

TABLE 17

| Field name | Data type | Description |
| --- | --- | --- |
| Host | Text | Host name or IP address of the host to query (Primary key). |
| Active | Char | Determines if this host is "active", i.e., should be used in the polling process. |
| LastReply | datetime | Date and time of the last reply from the host. |
| LastAttempt | datetime | Date and time of the last attempt to query the host. |
| LastModify | timestamp | Timestamp from when this record was last modified. |

PurgeList

The PurgeList table can be used by the scheduled process autorun_purge.pl to automatically clean out entries from the database that should no longer create out of cycle any more.

Table 18 is a layout of the PurgeList:

TABLE 18

| Field name | Data type | Description |
| --- | --- | --- |
| TFileName | Text | File name that should have associated transmissions deleted. Primary key. |
| AddDate | Date | Date in YYYY-MM-DD format that the entry was added to the PurgeList table. |

TABLE 18-continued

| Field name | Data type | Description |
|---|---|---|
| PurgeDate | Date | Date in YYYY-MM-DD format that the entry should be removed from the system. |
| LastModify | timestamp | Timestamp recording of when this record was last modified. |

Miscellaneous Notes

Variable Filenames

Variable file names are files that contain placeholders for dates/times/etc. Each variable is enclosed in a [ ] pair and is usually a two-character variable indicator.

Table 19 is an illustrative, non-limiting list of variables that the system can recognize:

TABLE 19

| Variable | Description |
|---|---|
| [OY] | Order year (2 digits) |
| [OM] | Order month |
| [OD] | Order day |
| [JOD] | Julian Order Day |
| [CM] | Current month |
| [CD] | Current day |
| [JJJ] | Current Julian Day |
| [YY] | Current year (2 digits) |
| [YYYY] | Current year (4 digits) |
| [HH] | Current hour |
| [MM] | Current minute |
| [SS] | Current second |
| [WD] | Current Day of Week (1 = Monday, 7 = Sunday) |

For example, if a file is named TEST and the current month and day is to be appended to it, the resulting variable file name would be TEST[CM][CD].

Using variable file names can be important when setting up records in the DeliveryInfo table if a file is downloaded with a date and time stamp on it.

PC Transmissions

PC Transmissions can be used to copy a source file (LANFileName) to a destination file (DestFileName). The DestFileName can be a UNC path allowing a user to copy the file to remote computers; however, the machine on which the delivery agent 18 is running should have access to the destination location for the copy to work.

Otherwise, outside processes can use the "pcupdate.pl" script to update the Translog.

PGP Notes

The system can use the module SPGP, written for example in the Perl programming language, to encrypt files internally without the use of a system call. Using the SPGP module greatly increases reliability since untrusted keys will not disrupt the encryption process. However, dynamically created agents (ONETIME and RERUN) may not be able to use the internal module if they cannot find the key ring files necessary to run PGP. So the system can support both methods, internal and external. To use the internal (SPGP) method, the PathToPGP field in the ProcConfigTable can be set to empty. To use the external (system call) method, enter the directory of the binary corresponding to the executable image of the PGP utility.

Master Application

About the Master Application(s)

The Master Application 24 is responsible for creating and monitoring delivery agents 18. If a delivery agent 18 becomes "active," the Master Application 24 will fork off a new instance of the script corresponding to such delivery agent 18. If a delivery agent 18 terminates (normally delivery agents 18 should run continually), the Master Application 24 will check the delivery agent's NotifyAddrList to see if anyone should be notified of the termination.

In addition to monitoring the delivery agents 18, the Master Application 24 also monitors the status of the connection to the database server hosting the various data stores, as well as connectivity to the network. If the connection to the database goes down and repeated attempts to re-establish connection fail, the Master Application 24 can alert a distribution list of system administrators. Likewise, if the Master Application 24 detects that network connectivity has been lost, it will send out an alert e-mail and optionally begin to move processes over to the backup delivery agents 18.

The description below discusses an illustrative implementation of the invention. Those skilled in the art will recognize that variations, modifications, or alterations of this teaching is possible without departing from the spirit and scope of the invention.

Starting the Master Application

The initial state of the Master Application 24 after launching is "disabled", meaning that the Master Application 24 is not monitoring anything. To enable monitoring, assuming a suitable graphic user interface using typically-labeled pull-down menus has been constructed, select an "Enable Process Monitoring" from, for example, a "Utility" menu. After process monitoring has been enabled, any processes that should be activated will be started.

Stopping the Master Application

To bring down the Master Application 24, select, for example, the "Enable Process Monitoring" menu item from the "Utility" menu while monitoring is enabled. This will cause all delivery agents 18 currently running to be deactivated. The Master Application 24 will wait until all delivery agents 18 have cleanly shutdown before shutting itself down.

To re-enable process monitoring, it may be necessary to re-activate all the delivery agents that were terminated when down the Master Application 18 was brought down.

Process Management Console

From the Process Management Console, a user can modify the settings of all the delivery agents 18 under the Master Application's control, create new delivery agents 18 to run under the Master Application 24 or delete existing delivery agents 18. In addition, a user can also administer the notification lists for each delivery agent 18, which lists will be used when a delivery agent 18 is terminated unexpectedly.

Application Log

The Master Application 24 keeps a log of all system activity. This log can be viewed by selecting the "View Application Log" menu item in the "Utility" menu. The log will show the oldest message first and the newest message last.

General Settings

From the "General settings" option under the "Utilities" menu a user can adjust the settings of the Master Application 24 itself. The user can set the database that the Master Application 24 accesses, the number of errors to tolerate before sending out an alert e-mail and the location of the Perl executable and the Autorun.pl script, and the email address of the Master administrator or distribution list.

The settings of the Master Application 24 form will also allow the user to control how the Master Application 24 will spawn the delivery agents 18. The user can choose to have the processes created in normal windows, minimized windows on the task bar or completely hidden windows.

Network Monitoring and Backup Setup

This menu option allows the user to configure how the Master Application 24 monitors the network and what to do if it detects that the network has gone down. By default, network monitoring can be disabled, meaning that the Master Application 24 does not test the health of the network connection. Even though network monitoring is disabled, the Master Application 24 will still respond to queries by other Master Applications 24 to test the network connection; however, these queries are not run continuously and are run only when requested.

By enabling network monitoring, the Master Application 24 can test the network connection by seeing if the specified host is still reachable. If the host is unreachable, then the Master Application 24 records this as an error. When the number of consecutive errors reaches the specified threshold value, then the Master Application 24 decides that the network has gone down. If the user has enabled backup rollover procedures, then the Master Application 24 will shutdown the primary delivery agents 18 and enable backup delivery agents 18 to handle the load previously supported by the primary delivery agents 18. When the Master Application 24 detects that the network connectivity has been re-established, the backup delivery agents 18 are shut down and the primary delivery agents 18 are brought back up.

If backup rollover procedures are not enabled, then the Master Application 24 will simply send out an alert e-mail and do nothing.

Backup Delivery Agents

Backup delivery agents 18 are delivery agents 18 that are intended to pick up the work when the primary delivery agent 18 loses network connectivity. To configure the backup delivery agents 18, the invention can support specification of a backup "suffix" for the primary delivery agents 18. For example, if a given delivery agent 18 is named PACKAGE and the suffix "_BAK" is specified, then PACKAGE's backup delivery agent 18 would be named PACKAGE_BAK. The Master Application 24 uses the suffix to determine the name of a delivery agents' backup. The backup processes preferably have an entry in the ProcConfigTable to facilitate rollover procedures.

When the Master Application 24 determines that the network is down, it sends out a request to the backup delivery agents 18 asking it if it has connectivity. The backup delivery agents 18 then tests the network using the host specified in its settings and reports the result back to the primary Master Application 24. If it has the green light, then the primary Master Application 24 proceeds in activating the backup delivery agents 18.

When the Master Application 24 switches over to the backup delivery agents 18, the following can take place. First, the primary agents 18 are disabled by setting their Active flag to a 'N' in the ProcConfigTable. Then, all transmissions that have not been sent out successfully or have issued a fatal error are reset; i.e., the number of attempts are reset to 0 and fatal errors are converted to non-fatal errors to be resent. This allows the backup delivery agents 18 to try to resend files that did not go by the primary delivery agents 18, perhaps due to the network outages. Next, the ProcessID field in the DeliveryInfo table is modified from the primary delivery agents 18 to the backup delivery agents 18. Finally, the backup delivery agents 18 are enabled by setting their active flag to a 'Y'. The corresponding Master Application 24 that controls those processes then takes control of them.

The same processing can occur when the primary Master Application 24 determines that network connectivity has been restored. The backup delivery agents 18 are disabled, the database entries are moved back over and the primary delivery agents 18 are re-enabled.

Web Based Tools

Delivery Information

This function allows the user to modify the contents of the DeliveryInfo table described above. Using this interface, the user can add new records, modify existing records, or delete records entirely. The following sections give a brief description on how the interface works the functions assigned to various components.

Selecting a Key

When the user first enters the Query/Update DeliveryInfo page, the user is presented with a list of all the keys (which are file names with date variables in them) in the DeliveryInfo table. One method for locating a desired file is to scroll through the list box, find the file, and click the "Query" button. This will take the user to the query/update page where he/she can make changes and update the database (if the user have proper access).

This page also has features that make finding a file easier by limiting the files displayed to only those matching a search pattern by simply entering in a text box field selecting which database field to search in, and clicking the "REFRESH" button to update the file list. Using this, the user can display only files matching a specific T file name, Process name, or any other data stored in the DeliveryInfo table.

Deleting a Record

One method to delete a record from the DeliveryInfo table is to select the key (using the procedure mentioned above), and press a "Delete" button.

Creating/Updating a Record

To create a new record or update an existing record, the user can press either the "New" or "Query" button. The "New" button will create a blank record where the user would fill in all the necessary fields. The user can model after an existing record by querying it, changing the key (LANFileName) and saving the new record.

The following sections detail what illustrative fields in the Create/Update record page do and what can be included in them.

LAN Filename

The LAN Filename field is where the user can enter the variable file name that he/she wants to look for in the Transmit directory.

Destination Filename

This is the name of the file as it should appear on the client's or destination computer system end (i.e., if you are sending an e-mail transmission, this would be the name of the attachment.) However, if the user is sending an FTP transmission, this would be the name of the file to be put on the client's FTP server. Variable file names may be to give the transmitted file a unique name every time it is transmitted. For files that are packaged or encrypted prior to being delivered, it may be necessary to ensure that the file ends in the correct extension.

T Filename

The T Filename field contains the name of the "T" file on the originating computer system 14 for both normal PDL output and special out-of-cycle source files.

Add to Package

This drop down field allows the user to select which package file to add the current file to. Leaving this field set at "None" delivers the file normally.

Process

The Process field allows you to select which pre-processes (if any) are performed prior to transmitting the file. For example, the system can package a file (regular archive or self-extracting) using ZIP® or PKZIP™, for example, or encrypt a file using PGP™ for example.

Password/Key

This field can be used to specify a ZIP® or PGP™ encryption key. If none are required (i.e., a plain ZIP file) then this field can be left blank.

Method

The Method field defines which transmission method to use to deliver the file. For example, the system can support the following illustrative, but non-limiting, methods:

| Method | Description |
| --- | --- |
| MAIL | Transmits a file via e-mail. |
| FTP | Transmits a file to a client's FTP server. |
| HTTPFTP | Delivers a file to our internal HTTP/FTP server. |
| PC | Designates that this file will be an async transmission. |
| BBS | Similar to the PC transmission, this is used to only "tag" the file. |

IP/Host/Address

The IP/Host/Address field is where the user can enter the client's FTP server address (for FTP transmissions) or the client's e-mail address (for MAIL transmissions). Basically, if the user needs to specify a network address of any type, it can go here.

For MAIL transmissions that have multiple recipients, each recipient address can be separated by a delimiter such as a semi-colon ';'.

User Name

The User Name field allows the user to enter whatever user name is required to log into the client's system, as may be required by various file transfer protocols. User names/passwords may be case sensitive.

Password

The Password field is the corresponding password to use with the User Name, as may be required by various file transfer protocols. User names/passwords may be case sensitive.

Directory/Path

The Directory/Path is used for FTP, HTTPFTP, PC and BBS transmissions. It designates which directory on the client's FTP server that the file should be PUT to. For HTTPFTP and BBS transmissions, it is possible to use the standard directory names (i.e., CLIENTID/file). For FTP transmissions, the system can use whatever directory is specified by the client. If the client does not have a specific directory to download to, this field can be left blank.

PC Transmissions can also make use of this field. If the user enters a directory path in this field, the system will copy the file to the specified directory. If the directory is omitted, then the file is copied to the current working transmit directory 12.

Flags/Options

The Flags/Options drop down box lets the user choose from various flags to use when sending the file. Possible embodiments include an ASCII or BINARY flag. It may be important that the correct flag be selected that matches the type of file being sent. For example, if a ZIP® file is being sent, then this flag is preferably set to BINARY. For plain ASCII text files, this flag is preferably set to ASCII.

Midday Flag

If this file is part of a midday pull output, then select 'Y'. If not, select 'N'.

Type Flag

The Type Flag is used to designate whether the file is created out of PDL or is a out-of-cycle source transmission. While this may not be critical to file delivery (similar to the Midday Flag), a correct value is preferably set for the benefit of other reporting programs (like HTML TransLog).

Note that in addition to "PDL" and "SOURCE," there may be other files that do not fit either PDL or SOURCE descriptions.

Onhold Flag

An Onhold flag can indicate whether this file should be sent as normal or whether the system should skip this file when processing.

Realtime Flag

The RealTime Flag is a Y,N indicator that will instruct the system whether to use the OS date and time stamp in determining whether to send the file. If the flag is set to 'N' (the default) then a file will only be sent once and the user must rely on the date and time variable within the file across multiple days. If the flag is set to a 'Y', then the file will be sent if the OS date and time stamp of the last modification changes.

Max Retry Attempts

The Max Retry Attempts indicates how many times the system will attempt to deliver a file. If this limit is reached and the file is still not sent, then it is considered a failed transmission.

Creation Interval

The Creation Interval field can indicate how often a file creates. Examples include DAILY, WEEKLY, MONTHLY or YEARLY to match whatever PDL has setup.

Process ID

This field allows selection of a delivery agent 18 which will be responsible for delivering this file.

Comments

The Comments field allows entry of any informational notes, comments, etc.

Delivery Packages

The Delivery Packages feature allows a user to archive and/or compress multiple files together and transmit them as a single file. For instance, the user could instruct the system to use PKZip™ to package three PDL created files and FTP the archive to the client.

The system package logic uses "trigger" files to let the delivery agents 18 know when all possible PDL or SOURCE files have been created. When a trigger file is downloaded to the LAN, the system builds a list of all the packages dependant on that trigger. It then processes each package, checking to see which files on the LAN should be added. Once the package has been built, the resulting package file will be picked up and delivered normally.

Selecting a Package

From a drop down menu devoted to package file selection, a user can select pre-existing packages to modify by selecting the package to modify and clicking on the "Refresh" button to update the page. The user can also limit the selection to a specific search pattern by entering a pattern in the text entry field below the drop down menu.

Package File Name

This text field is used to enter the variable file name of the package file to create on the LAN. In illustrative embodiments of the invention, changing the package file name of existing packages does not automatically overwrite the previous package file, but creates a new one with the new name entered.

Packaging Method

This drop down field is used to specify how to (or what method to) package the files. Currently, the three packaging methods are ZIP™, ZIP™+PGP™ and SFX. The ZIP™ method simply combines all the files associated with this package into a single ZIP™ file. The ZIP™+PGP™ method will do the same but also encrypt the combined file using PGP™

The SFX option will allows creation of self-extracting ZIP™ files.

Encryption Key

This field can be applicable to ZIP™+PGP™ packaging methods and allows specification of the name of the PGP™ key used in encrypting the ZIP™ file. This is required for all ZIP™+PGP™ packages.

Create Package

This drop down field is used to specify when the package should be created, either after PDL completes or after SOURCE has finished downloading. Preferably, the user can select the appropriate trigger depending on the contents of the file (i.e., SOURCE files are in the package, make sure the package is created only after SOURCE downloads completely).

Updating Package Information

To update package information entered, the user can click on the button at the bottom of the page labeled "Update." If an existing LANFileName is not in the database, the system will proceed with the update.

Deleting Package Information

A selected package can be deleted by clicking the "Delete" button. The web page can prompt for confirmation and can ask if the user wishes to delete all associated files along with the package. If the user clicks on the "OK" button, all files associated in this package will be deleted along with the package. If the user clicks on "CANCEL," only the package file will be deleted, but the individual files associated with that package can remain in the DeliveryInfo table and will have to either modified or deleted manually.

One-Time Delivery

The "One-time Delivery" function will allows the user to send a given file on the LAN using a DeliveryInfo record as the transmission specifications. This lets the user send test files or rerun files without having to modify the contents of the DeliveryInfo to change the LAN file name or the destination file name. In addition, the user can add a one-time notification address where an email will be sent to indicating the status of the delivery.

When sending a file using the One-time process, the system can create a new record in the DeliveryInfo table. This new entry is tagged with the user name and put under the control of the One-time process. Every time the One-time delivery process is used, the system can overwrite the One-time DeliveryInfo record for that given user name.

Generally, most of the fields here are identical to the fields found in the "Update DeliveryInfo" page. See the above section for information on those individual fields.

When the user is finished entering information, he/she can click the "Transmit" button at the bottom of the page, causing the One-time process to open and deliver the file.

Selecting a DeliveryInfo Key

To help make setting up a Onetime file delivery a bit faster and easier, the user can choose to model his/her Onetime file after an existing DeliveryInfo record. To do so, the user can simply choose the DeliveryInfo file to model after from the drop down menu under the "Select DeliveryInfo entry to model after" section. After selecting a new file, the page can automatically refresh and populate all the fields using the information from the selected file. This procedure need not overwrite the "source" entry serving as the model.

Source/Destination File Names

Two bits of information not carried over when modeling after an existing DeliveryInfo file are the LAN File Name and the Destination File Name fields. The LAN File Name field can contain the name of the file on the T:\ONETIME directory to be sent, and the Destination File Name field should contain the name of the file to be used at the destination.

Downloading files from the Tandem

If a T-file name is specified in the "\IOMH T File to Download" field, then this can cause the One-time process to use IPDOWN to retrieve a file from the originating computer system 14 and place it on T:\ONETIME before sending it. The file name specified in the "LAN Filename" field can be used as the name of the file to download as. The user can also specify whether IPDOWN automatically adds carriage return and line feed characters to the file by the "use AUTO" check box toggle. This is enabled by default and a checked field indicates that the newline characters will be added.

E-Mail Notification

The user can choose to receive an e-mail after the One-time process delivers the file (whether it was successful or not). To do so, simply enter an e-mail address in the "E-mail Notification" field. Multiple addresses can be separated by an delimiter such as a semicolon.

Internal Transmission Copies

The "Internal Transmission Copies" interface allows the user to manage the e-mail recipients who are sent a copy of a file after it has been successfully transmitted. These files can be identical to what is downloaded to the transmit directory 12, i.e., they will not be encrypted or packaged.

Selecting a Transmission to Query

The user can select the transmission to receive via e-mail by selecting the T-file name from the drop down menu. There are also at least two ways to limit the number of T-files displayed in the menu. First, the user can limit the list to only the T-files that contain selected text. Second, the user can limit the list to contain only T-files that have e-mail recipients matching the selected text. To limit the list, enter the search text in the field below the drop down menu, select the field to perform the search in (either T-file name or Email address) and click the "Refresh" button to refresh the list of T-files.

Deleting an Address

To delete an address from the e-mail list, select the file that the address is on, and click the "DELETE" button next to the address you want to delete.

Adding an Address

To add an address to the e-mail list, select the T-file to receive. After the browser is finished refreshing, type in the addresses in the text field at the bottom of the page. Then click the "Add" button, and the address will be added to the database.

Delivery Notification

This function allows the user to update the E-mail Notification List. The E-mail Notification List can contain a list of e-mail addresses that are sent a notification when a file is delivered/or failed to be delivered successfully through the normal process or through the Rerun process.

Selecting a Key to Query

Notification Lists are grouped by DeliveryInfo files. Select the file to update from the drop down box. On changing the filename, the browser can refresh the web page and show all of the addresses that are associated with that file.

Like the Internal Transmission Copies function, the user can also limit the files displayed. By entering search text in the field next to the label "Limit file list to" and selecting which field to filter for the search, the user can limit the files shown in the drop down file menu.

Deleting an Address

To delete an address from the notification list, select the file that the address is on, and click the "DELETE" button next to the address you want to delete.

Adding an Address

To add an address to the notification list, select the file to be notified on. After the browser is finished refreshing, type in the addresses in the text field below the list box. Then click the "Add" button and the address will be added to the database.

Advanced Query

The Advanced Query function allows the user to search for a specified search string in the entire database. This can be useful, for example, for finding which DeliveryInfo/MailInfo record contains a given e-mail address. The Advanced Query script can provide the table name, field name, Primary Key of the table and the complete field data string for each occurrence found for a given query.

Entering a Search String

The first step to entering a query is to enter the string for which to search the database in the text field next to the label "Search for." This text may or may not be case sensitive.

The user may need to "escape" certain characters in this field. For instance, if the user is searching for T:\PCMACS, the user should enter T:\\PCMACS instead.

Selecting a Table to Query

The second step to entering a query is to select the SQL table in which to perform the search. The drop down menu next to the label 'in table' will list all the tables available for search in. If unsure which table the string might be in, the user can select the 'ALL' option at the top of the list to search every SQL table.

Selecting a Field to Query

After selecting a table to query, the drop down list containing the field names in that table will be populated. The user can further limit your search by selecting a field from this drop down menu or search all fields by selecting the option 'ALL' at the top of the list.

'Exact Match' Toggle

Normally, the Advanced Query script can search for the specified search string in any part of the field data. The user can force the script to only return results that match the search string exactly by checking the box next to the label 'Display only exact matches'.

Viewing Results

After the user has entered his/her search criteria, he/she clicks on the 'Submit Query' button. The script will then report the number of matches found, followed by the results (if any). If no matches were found, the page can simply display a message stating so and the user can refine his/her search parameters if necessary.

If the search parameters returned results, they can be displayed in the order that they are found in the database. For each result, the page can display the table that the match was found in, which field in that table the match was found in, the Primary Key of the table, and the contents of the field that the match was found in (useful if you are not performing an exact match).

If the user has the appropriate access permissions, the Primary Key field can also be a link to whatever page is necessary to change that value.

View Log Files

This function allows the user to view log files generated by the system. The log files can be basically a debug dump from the various processes called when sending a file. The files can be logged to the ./LOGS[CM][CD] directory, where [CM][CD] is the current month and day of the process.

Selecting a Log File

The user can select a log file to view by entering in the specific date when the log file is created and clicking the "Refresh" button. After the browser finishes refreshing, the user can then select the file to view and click the "View Log" button.

Reading a Log File

The log files can be a debug output from Perl as it processes the files. Several things to note: If a given file is sent more than once a day (because of a rerun) then the output of the subsequent runs can be appended to the log file. Also, the system will insert information for itself before starting the debug output. Prior to each run, the system will insert the date and time of the run followed on the next line by the DeliveryInfo key that was used.

From here, the user can also cross-query the file in the DeliveryInfo table, if the user has permission.

The Special Log File

The log files "*.Autorun.log" can be special log files. They can contain a mirror of all the output that the processes generate on the command line. The file can be prefixed with the name of the process whose output is being dumped into it. All rerun processes can be started from the command line or web interface can go to the 'rerun.autorun.log' file.

InstaGrep Log Files

The InstaGrep function allows the user to enter in a regular expression or search pattern and look for matches in all the files in the log directory for the selected day. To use this feature, simply select the date when the log file generated and enter a search string or pattern in the "InstaGrep" field and click on the "InstaGrep" button. This will redirect to a new page, showing the results of your search.

View Transmission Logs

The TransLog is a tool that was designed to show a log of the transmissions that the system has sent out. The TransLog can have at least two different "views." The first view is the summary view. It can show the company name, file on the originating computer system 14, LAN file, generation type and sent flag. In the summary view, the TransLog can show all of the days' entries.

In the "detailed" view, TransLog can show detailed information about the delivery such as the number of times the system tried to send the file and the last time an attempt was made. The user can also resend transmissions from the detailed view.

All the information contained in the TransLog can be a reflection of the data stored in the SQL tables. Changes to parameters such as Contact information, Delivery information, etc. can cause the information in the TransLog to change.

Limiting Information Displayed

When the user first enters the TransLog page, he/she will be prompted to specify display or search criteria. This allows the user to limit the amount of information displayed.

The first drop down menu lets the user choose which SQL table from which to show results. Normally, the user may only want to view entries in the TransLog, but if he/she wants to research information sent from a rerun or ONE- TIME delivery, he/she can select the 'RerunLog' option. The user can also query the TransLogArchive table, to view archived data that has been purged out of the TransLog table. To perform queries against all three tables, select the "All" option.

The second drop down menu lets the user choose which type of transmissions are displayed. The user may choose to view PDL, SOURCE or OTHER type transmissions, or view all transmissions by selecting the "All" option.

The file name filter field allows the user to limit results to only entries which ExpandedLANFile field matches the filter string. This is useful when the user already knows the file name in question and just wants information reported about that file.

The date fields allow the user to specify the date from which to display results. A check box labeled 'show all days' can do exactly that—it can return EVERYTHING in the SQL tables regardless of delivery date.

The sort fields allow the user to specify how the information is reported. The user can select several fields from the drop down box, and if the fields are sorted in ascending or descending order. The default setting can sort by the TimeStamp field in Ascending order.

The rest of the check box fields further limit the information displayed. The user can tell the script to only report entries that have been/have not been sent or only show midday pull files, etc.

Viewing Entries in Short Mode

The initial way of displaying entries from the TransLog is the "Short Mode", meaning can see all the entries that match the search criteria with limited information about each one. The user can see the Company Name, Tandem File, LAN File, Type, Sent Flag and Time Sent for each transmission in the TransLog.

Viewing Entries in Detailed Mode

If the user needs more detailed information on a specific transmission, or if he/she wants to resend a transmission (given the required privileges), the user can click on the button labeled "Detail." This can bring up the Detailed Transmission Information page about the selected file. This pages can provide a general summary of the transmission information as well as contact information. Any comments or status messages about the transmission can also be listed here.

Adding Manual Entries

The user can add a manual TransLog entry by clicking the button labeled "Manual Entry" at the bottom of the main page. Adding manual TransLog entries can be used if a file was sent out of the system and the user does not want the system to send the file again. The TransLog record can indicate that the file was sent successfully after one attempt. The destination file name will be the same as the LAN file you enter.

When the user clicks on this button, a Javascript window can appear listing the files in the DeliveryInfo table. Select the file to add to the TransLog and click on the "Add" button (or "Cancel" to abort).

Deleting TransLog Records

It is possible to delete an entry from the TransLog/ RerunLog by going into the detailed information page and clicking on the "Delete" button. This can remove the entry completely from the TransLog/RerunLog (depending on what is queried). Deleting entries is sometimes useful for administration purposes, and can be provided as a convenience so system administrators do not have to start up an command line SQL interface session.

Resending Transmissions

It is possible to force the system to resend a transmission that has already been sent or one that has failed or has not been sent yet. To do this, enter the detailed information page for the transmission to send and click on the "Resend" button. The user can be prompted to enter a destination file name (rerun files commonly can have different names than files that are normally delivered).

After entering the destination file name, a small Javascript™ window can appear and show the progress of the rerun process. If it should abort or fail for any reason, the information displayed from the rerun process can help in debugging.

After the rerun process completes, it can add an entry in the RerunLog table, which the user can then view from the TransLog main page.

Purge Lists

The "Purge List" function allows a user to view and modify the PurgeList table. This database table can be used by the autorun_purge.pl scheduled process that is responsible for deleting out entries in the system that are associated with a file on the originating computer system 14 that it no longer creates. This allows the system to provide a type of "self maintaining function." When files are no longer created in a regular cycle, they can be scheduled to be removed from the system as well.

Limiting Tandem Files Displayed

When the user first enters the "PurgeList" page, he/she can be presented with a list of ALL files scheduled to be purged from the database. There can be instances where this list is rather large. The user can limit the entries displayed by typing in the name (whole or part of) of the file on the originating computer system 14 to be viewed. Click the "REFRESH" button to reload the page and update the list.

Sorting Entries

There can be at least two ways to sort the files that are displayed in the PurgeList. By default, the files can be sorted by file on the originating computer system 14 in ascending order. The alternate method is to sort the list by Purge Date (date the file on the originating computer system 14 will be purged from the system) in descending order (i.e., newest first, oldest last). To toggle between the two methods, select either radio button under the search box and click the "REFRESH" page to reload and re-sort the list.

Deleting Entries

There may be times when a user does not want a file to be purged from the system (perhaps it is on hold, etc). Clicking the button labeled "DELETE" next to the name file in question will remove entry from the PurgeList, preventing the scheduled process from deleting it. The file will not be put back on the purge list until it is reinstalled in production and subsequently removed again.

Changing the Purge Date

Each entry in the PurgeList table can have a PurgeDate field which holds the date the entry should be deleted from the database. It is possible to change this "expiration" date by clicking on the PurgeDate field. A pop-up window can appear prompting the user to enter the new date in YYYY-MM-DD format.

Agent Configuration

The Agent Configuration tool allows the user to alter the settings of the registered delivery agents 18.

Many of the changes made to the delivery agents 18 may not be immediately recognized until the current cycle is complete. Changing the sleep time or Transmit directory may only take effect after the delivery agent 18 has completed its current cycle.

Adding Agents

The user can register a new delivery agent 18 by clicking on the radio button next to the "Add New Agent" field, entering a name for the delivery agent 18 and clicking the 'Add' button next to the name field. The user can also set the various options for the delivery agent 18 before adding as well.

Deleting Agents

To delete a delivery agent 18, select the delivery agent 18 and click the "Delete" button in the "Agent Properties" frame. Deleting a delivery agent 18 will cause all the records associated with that delivery agent 18 in the DeliveryInfo table to be put under control of the PRIMARY delivery agent, which typically is not deleted.

Enabling/Disabling an Agent

It is possible to start and stop a delivery agent 18 running under the Master Application 24 from this web interface. By checking or unchecking the "Active" flag, the user can start or stop the delivery agent 18. Typically, the delivery agent 18 should be under the control of the Master Application 24 and that changes will not be recognized until after the delivery agent 18 or the Master Application 24 has completed its current cycle.

Notification Lists

Each delivery agent 18 can have a Notification List which is a list of e-mail addresses that can receive an e-mail message if the delivery agent 18 is terminated (either manually or by a fault in the code). This allows administrators responsible for the process to be notified in the event of an error.

Network Monitoring

The "Network Monitoring" option can allow a user to maintain the lists of internet hosts that the Master Application 24 uses to determine if the network is up. From this interface, the user can add, delete, activate or deactivate hosts.

Adding Hosts

Adding a host to the Netmon table can cause the Master Application 24 to immediately begin using it to determine if the Internet is accessible. To add a host, simply enter the host name or IP address of the machine and click the "Add" button. All hosts added can be automatically enabled by default; however, the host specified should preferably be running web server software.

Deleting Hosts

To delete a host from the Netmon table, simply click the button labeled "DELETE" next to the host to be removed from the database, which action immediately can remove the host.

Enabling/Disabling a Host

In addition to deleting hosts, the user can also disable hosts from being polled, while keeping the host in the NetmonTable for future reference. To disable a host, simply click the check box next to the host to be disabled. To re-enable a host, click the empty check box and the host can be re-enabled and the Master Application 24 can begin to use that host in the polling process again.

User Maintenance

The "User Maintenance" interface can allow administrators to create, modify or delete users registered in the UsersAccess table. In order for a user to be able to access the system, they should first have their user name registered in the UsersAccess table. Generally, the user name will be the same as their staff LAN (WTC) login name.

Creating New Users

To create a new user, simply enter the user's name in the "User Name" field. Enter a description of the user (generally the user's first and last name) in the "Description" field and then designate the permissions for that user (see below for a description of all the fields). When this has been completed, click the "Update" button to add the new record.

Modifying an Existing User

The steps to modify a user are almost the same as adding a new one except that the user first chooses a user name from the drop down list (or enter an existing name in the "User Name" field). Then, modify the permissions for that user and click the "Update" button.

Permission Descriptions

Table 20 describes what each permission check box can mean according to an illustrative, but not-limiting, embodiment of the invention:

TABLE 20

| Field | Description |
|---|---|
| Query DeliveryInfo | Indicates that the user can query the DeliveryInfo table. |
| Modify DeliveryInfo | Indicates that the user has permission to update/delete entries from the DeliveryInfo table. |
| Modify Special DeliveryInfo | Indicates that the user has permission to update the "special" fields (ProcessID, MaxAttempts, etc). |
| Allow PGP | Allows the user to set up PGP files in the DeliveryInfo table. |
| Enable Onetime Reruns | Allows the user to use the Onetime delivery process to send files. |
| Enable TransLog Reruns | Allows the user to use the Rerun delivery process to resend files. |
| Modify E-mail Notification Lists | Indicates that the user can update the E-mail Notification Lists. |
| View Log Files | Indicates that the user has permission to view the debug log files. |
| View TransLog | Indicates that the user has permission to view the TransLog/RerunLog. |
| Modify TransLog | Allows the user to make updates to the TransLog entries |
| Modify RerunLog | Allows the user to make updates to the RerunLog entries. |
| Delete TransLog | Allows the user to delete entries from the TransLog. |
| Delete RerunLog | Allows the user to delete entries from the RerunLog. |
| Modify Agent Config | Enables the user to update the ProcConfigTable to configure the delivery agents. |
| Modify User Access | Enables the user to modify other users access permissions. |

Scheduled Processes

Below is a list of jobs that can be scheduled to run at a specific time, which maintain or update the state of the system or its delivery processes.

HTML Log Updater

This process can be an ECS scheduled job that runs the script autorun_log.pl and generates a flat text file representation of the TransLog in a file called autorun_log.log. HTML TransLog in turn uses autorun_log.log to generate a list of delivered files and the times that they were sent out.

The ECS job can be scheduled to run every 1 hour.

Database Backups

This process is an ECS scheduled job that runs the script autorun_bak.pl, which creates a dump log of the MySQL databases Autorun and AutorunTest. These dump logs can be used to restore the state of the database if the SQL server crashes. The dump logs can be sent to the T:\SQL\BACKUP\AUTORUN and T:\SQL\BACKUP\AUTORUNTEST directories. If these locations are changed, then the autorun_archive.pl script must be updated.

This ECS job can be scheduled to run once a day.

Monthly Archive

The Monthly Archive process can be an ECS job which can create PKZip™ archives of the debug log files and the MySQL™ database dump logs. All the ZIP™ archives can be placed in the "Archive" sub-directory under the main directory. The debug log files can be combined according to what sub-directory they are in, purged from the log directory and the log directory removed. The database dump log files are gathered up and can be combined into a file named "Database[cm][cd].zip." The database ZIP™ archive can contain database dump log files for about one month, for example.

This ECS job can be scheduled to run on the 1st of every month at 10:00 am.

Auto-Purging and Cleanup

This process can be an ECS scheduled job and can do at least two things. First, the process can read a flat file containing all the possible PDL transmissions that it could create. It can compare this list against the data from the previous day and build a list of files on the originating computer system 14 that are no longer created and delivered through the system. The list of such files can then loaded into the PurgeList table and scheduled to be deleted.

The second part of this process can read the PurgeList table to determine if there are any entries that have expired. If the script determines that an entry has expired, this script can delete all information from the database related to that file.

This ECS job can be scheduled to run once a day at 10:00 am.

Database Mirroring

This process can be an ECS scheduled job that copies the MySQL™ database files from a main SQL server to a backup SQL server. This can be added security in the event of a catastrophic failure of the main SQL server, so that the system can immediately switch over to the backup SQL server with little downtime and minimal loss of data.

This ECS job can be scheduled to run once every three hours.

Inactive Transmission Report

This process can be an ECS scheduled job that creates a report detailing transmissions that have not been sent in the last week as well as transmissions that have never been sent at all.

This ECS job can be scheduled to run every week on Monday, 8:00:00 am.

Command Line Tools

These tools can be accessible from a Windows NT™ command line, and can be found in either T:\PCMACS or \\westoma-fps02\autorun\util directories.

The pcupdate.pl Script

The "pcupdate.pl" script can be designed to be called from within a Procomm script, and can update the "PCFlag" field in the TransLog table to show whether a PC transmission was successful or not.

The autorun_log.pl Script

The 'autorun_log.pl' script is used to sync the HTML TranLog with TranLog. The script can read all of today's TranLog entries and create the file 'T:\TRANSMIT\AUTORUN_LOG.LOG' that the HTML TranLog can separate. In addition to today's entries, transmissions sent from the previous day from 23:00:00 onwards can also be included (to capture the previous night's 11:00 pull transmissions).

This script can also use the control file "t:\pcmacs\autorun_log.ini." There are times when a file in the system should be written to the log file as a different file name. In cases like this, the user can enter the system file and the desired file name in this control file and the "autorun_log.pl" script can perform the substitution while creating the log file. For more detailed information and setup procedures, the control file can contain embedded documentation in it that can be used for reference.

This script can be scheduled to run automatically from an ECS job (see above for details).

The autorun_bak.pl Script

The "autorun_bak.pl" script can be used to create a "dump log" of the contents of illustrative MySQL™ databases "Autorun" and "AutorunTest." These dump log files can be placed in the directory T:\SQL\BACKUP\AUTORUN and T:\SQL\BACKUP\AUTORUNTEST. If the SQL server should fail, these dump logs can be used to re-create the database tables and data.

If these directories are moved to the location of the dump logs, the 'autorun_archive.pl' script may need to be updated.

This script can also purge information from the TransLog table that is older than two days.

This script can be scheduled to run automatically from an ECS job (see above for details).

The autorun_archive.pl Script

This script can be used to create ZIP™ archives of the log files and database dump logs as well as clean up the log file directories. This is used to control the growing number of system log files. The ZIP™ files are placed in the "archive" sub-directory under the main system directory. The log files can be compressed into a ZIP™ file named after the log directory they are in, and the database dump logs can be compressed into a file called 'Database[cm][cd].zip'.

This script can be scheduled to run automatically from an ECS job (see above for details).

The autorun_report.pl Script

The "autorun_report.pl" script can provide a simple command line-based report on various data in the database. It can provide the number of transmissions, types of transmissions, up time, etc.

The autorun_purge.pl Script

The "autorun_purge.pl" script can be used to do two things. First, it builds a list of PDL transmissions that are no longer created by comparing the current day's list of possible transmissions to the previous day's data. This list of files that are no longer generated can then be added to the PurgeList table and scheduled to be automatically deleted.

The second part of the script searches through the PurgeList table checking expiration dates. If an entry has reached its expiration date, all data in the system associated with the expired file on the originating computer system 14 will be removed from the database.

This script can be scheduled to run automatically from an ECS job (see above for details).

The autorun_mirror.pl Script

This script can copy the MySQL™ database tables from the main SQL server to the backup SQL server. The script can then execute a read-lock on the database, copy the files, and unlock the database. In the event of a failure of the main SQL server, the backup SQL server cam be ready to serve the delivery agents 18 and web users with little downtime and minimal loss of data.

This script can be scheduled to run automatically from an ECS job (see above for details).

The update_inst.pl Script

This script can help install codes from the test bed server to the production system by examining the timestamp of the files from the system's root directory, 'autorun_mods' directory, and the 'cgi-bin' directory. If a file on the test system has a newer timestamp than the production file, the script will ask the user if he/she wants to copy the test version over to production.

The tmidday.pl Script

This script allows the user to quickly determine if a given T-file is in Autorun, and if it is part of a Midday pull transmission. The script can prompt the user to simply enter a T-file name and it reports back to the user.

The global_addrdel.pl Script

This script allows the user to delete an e-mail recipient from the MailInfo table, but may not delete the recipient if they are the sole recipient of a particular e-mail. The script can allow the user to operate on a specified list of records or across the entire MailInfo table.

The cleandb.pl Script

This script can purge all the data in the database except information stored in the ProcConfigTable, ProcStatus and UsersAccess tables. This can be generally used when cleaning out the development side database and preparing to archive it onto CD.

The inactive_rpt.pl Script

This script can e-mail a report with a detailed list of transmissions that have not been sent in the last week and transmissions that have never been sent.

This script can be scheduled to run automatically from an ECS job (see above for details).

Computer-Readable Media

As those skilled in the art will understand, a program of instructions can be loaded and stored onto program storage media or devices, such as program storage device 500 as shown in FIG. 2, which media or devices are readable by a computer or other machine, embodying a program of instructions executable by the machine to perform the various aspects of the method as discussed and claimed herein, and as illustrated in the Figures. Generally speaking, the program storage device 500 can be implemented using any technology based upon materials having specific magnetic, optical, semiconductor or other properties that render them suitable for storing computer data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 500 can be affixed permanently or removably to a bay, socket, connector, or other hardware provided by the cabinet, motherboard, or other component of a given computer system.

Those skilled in the art will also understand that a computer programmed in accordance with the above teaching using known programming languages provides means for realizing the various functions, methods, and processes as described and claimed herein and as illustrated in the drawing figure attached hereto. Specifically, while program storage device 500 is featured only in FIG. 2 for the sake of conciseness, it will be understood that those skilled in the art may implement the various methods taught herein by developing appropriate software and loading such software onto storage devices such as program storage device 500.

An application program implementing and executing the various aspects of the method discussed above and shown in the drawing figures, and can be coded using any suitable programming or scripting language. However, it is to be understood that the invention as described herein is not dependent on any particular operating system, environment, or programming language. Example operating systems include without limitation LINUX, UNIX, or any of the Windows™-family of operating systems, and example languages include without limitation a variety of structured and object-oriented languages such as C, C++, Visual Basic, or the like.

Those skilled in the art will also understand that a computer programmed in accordance with the above teaching using known programming languages provides means for realizing the various functions, methods, and processes as described and claimed herein and as illustrated in the drawing figure attached hereto.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims and their equivalents.

We claim:

1. A method, comprising:

creating at least one master file delivery application and at least two file delivery agents running on at least one originating computer system comprising a processor and memory, wherein a first file delivery agent of the at least two file delivery agents is controlled by a first master file delivery application of the at least one master file delivery application and wherein a second file delivery agent of the at least two file delivery agents is run either by a second master file application of the at least one master file delivery application or standalone from the at least one master file delivery application; and dynamically balancing loads, by the at least one master file delivery application, between the first file delivery agent controlled by the first master file delivery application and the second file delivery agent run either by the second master file application or standalone from the at least one master file delivery application, wherein the balancing is based on a number of files retrieved by the first file delivery agent and a number of files retrieved by the second file delivery agent.

2. The method of claim 1, further comprising scanning at least one directory associated with the at least one originating computer system, finding at least one file in the at least one directory, obtaining at least one destination parameter associated with the at least one file, and transmitting the at least one file.

3. The method of claim 1, further comprising creating at least one master file delivery application and at least one file delivery agent running on the at least one originating computer system.

4. The method of claim 2, wherein scanning at least one directory, finding the at least one file, obtaining at least one destination parameter, and transmitting the at least one file are performed by at least one file delivery agent.

5. The method of claim 2, further comprising placing at least one file into the at least one directory.

6. The method of claim 5, wherein placing at least one file includes placing the at least one file into at least one normally-empty directory.

7. The method of claim 1, further comprising creating at least one master file delivery application and a plurality of file delivery agents, at least one of the plurality of file delivery agents being associated with a respective master file delivery application.

8. The method of claim 7, wherein creating the at least one file delivery agent includes creating at least one file delivery agent that is not controlled by a master file delivery application.

9. The method of claim 1, further comprising creating a plurality of master file delivery applications and a plurality of file delivery agents, at least a first one of the file delivery agents being associated with a first one of the master file delivery applications, and at least a second one of the file delivery agents being associated with a second one of the master file delivery applications.

10. The method of claim 2, wherein obtaining at least one destination parameter includes accessing at least one data structure residing on the at least one originating computer system.

11. The method of claim 2, wherein obtaining at least one destination parameter includes accessing at least one database table residing on the at least one originating computer system.

12. The method of claim 2, wherein obtaining at least one destination parameter and transmitting the at least one file are performed entirely on the at least one originating computer system independently of at least one destination computer system comprising a processor and memory.

13. The method of claim 2, wherein transmitting the at least one file includes initiating a transfer of the at least one file entirely on the at least one originating computer system.

14. The method of claim 2, wherein scanning at least one directory includes scanning at least one normally-empty directory.

15. The method of claim 2, further comprising putting at least one file delivery agent to sleep for a predetermined timeout period after it completes a first scan of the at least one directory, and further comprising awakening the at least one file delivery agent after expiration of the predetermined timeout period to perform at least a second scan of the at least one directory.

16. The method of claim 1, further comprising generating a log file containing information related to at least one file transmission.

17. The method of claim 1, further comprising encrypting the at least one file before transmitting the at least one file.

18. The method of claim 2, wherein finding at least one file includes finding a plurality of files in the at least one directory.

19. An apparatus, comprising:
at least one processor and memory;
means for creating at least one master file delivery application and at least two file delivery agents running on at least one originating computer system, wherein a first file delivery agent of the two file delivery agents is controlled by a first master file delivery application of the at least one master file delivery application and wherein a second file delivery agent of the two file delivery agents is run either by a second master file application of the at least one master file delivery application or standalone from the at least one master file delivery application; and
means for dynamically balancing loads, by the at least one master file delivery application, between the first file delivery agent controlled by the first master file delivery application and the second file delivery agent run either by the second master file application or standalone from the at least one master file delivery application, wherein the balancing is based on a number of files retrieved by the first file delivery agent controlled by the first master file delivery application and a number of files retrieved by the second file delivery agent run either by the second master file application or standalone from the at least one master file delivery application.

20. A program non-transitory storage device readable by a machine comprising at least one processor and memory, tangibly embodying a program of instructions executable by the machine to perform:
creating at least one master file delivery application and at least two file delivery agents running on at least one originating computer system, wherein a first file delivery agent of the at least two file delivery agents is controlled by a first master file delivery application of the at least one master file delivery application and wherein a second file delivery agent of the at least two file delivery agents is run either by a second master file application of the at least one master file delivery application or standalone from the at least one master file delivery application; and
dynamically balancing loads, by the at least one master file delivery application, between the first file delivery agent controlled by the first master file delivery application and the second file delivery agent run by the second master file delivery application, wherein the balancing is based on a number of files retrieved by the first file delivery agent controlled by the first master file delivery application and a number of files retrieved by the second file delivery agent run either by the second master file application or standalone from the at least one master file delivery application.

* * * * *